(12) United States Patent
Besley

(10) Patent No.: US 10,502,946 B2
(45) Date of Patent: Dec. 10, 2019

(54) ILLUMINATION SYSTEMS AND DEVICES FOR FOURIER PTYCHOGRAPHIC IMAGING

(71) Applicant: CANON KABUSHIKI KAISHA, Tokyo (JP)

(72) Inventor: James Austin Besley, Killara (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/538,113

(22) PCT Filed: Dec. 11, 2015

(86) PCT No.: PCT/AU2015/000747
§ 371 (c)(1),
(2) Date: Jun. 20, 2017

(87) PCT Pub. No.: WO2016/101008
PCT Pub. Date: Jun. 30, 2016

(65) Prior Publication Data
US 2017/0371141 A1    Dec. 28, 2017

(30) Foreign Application Priority Data

Dec. 23, 2014    (AU) .................................. 2014280894

(51) Int. Cl.
*G02B 21/36*    (2006.01)
*G06T 5/50*    (2006.01)
(Continued)

(52) U.S. Cl.
CPC ........... *G02B 21/367* (2013.01); *G02B 21/06* (2013.01); *G02B 21/361* (2013.01);
(Continued)

(58) Field of Classification Search
CPC .... G02B 21/367; G02B 21/06; G02B 21/361; G06T 3/4076; G06T 5/50; G06T 3/4084; G06T 11/006; G06K 9/00134
See application file for complete search history.

(56) References Cited

U.S. PATENT DOCUMENTS 5,309,277 A    5/1994    Deck
9,426,455 B2 *    8/2016    Horstmeyer ......... G01N 23/205
(Continued)

FOREIGN PATENT DOCUMENTS

CA    2921372 A1 *    2/2015    ........... G02B 21/084
CN    104200449 A    12/2014
WO    2014070656 A1    8/2014

OTHER PUBLICATIONS

Zheng, Guoan, Roarke Horstmeyer, and Changhuei Yang. "Wide-field, high-resolution Fourier ptychographic microscopy." Nature photonics 7, No. 9 (2013): 739-745.
(Continued)

*Primary Examiner* — Jamie J Atala
*Assistant Examiner* — Michael Robert Cammarata
(74) *Attorney, Agent, or Firm* — Canon USA, Inc., IP Division

(57) ABSTRACT

A system for forming an image (110) of a substantially translucent specimen (102) has an illuminator (108) configured to variably illuminate the specimen from a plurality of angles of illumination such that (a) when each angle (495) at a given point on the specimen is mapped to a point (445) on a plane (420) perpendicular to an optical axis (490), the points on the plane have an increasing density (e.g. FIGS. 4, 11C, 11E, 12C, 12E, 13A, 14A, 14C, 14E, 15A, 15C, 15E) towards an axial position on the plane; or (b) the illumination angles are arranged with a substantially regular pattern in a polar coordinate system (FIG. 13A,13B) defined by a radial coordinate that depends on the magnitude of the
(Continued)

distance from an optical axis and an angular coordinate corresponding to the orientation of the angle relative to the optical axis. A detector is configured to acquire a plurality of variably illuminated, relatively lower-resolution intensity images (104) of the specimen based on light emitted from the illuminator according to variable illumination and filtered by an optical element (109). A processor is arranged to computationally reconstruct a relatively higher-resolution image of the specimen by iteratively updating overlapping regions (1005) of the relatively higher-resolution image in Fourier space (FIG. 10B) with the variably-illuminated, lower-resolution intensity images.

19 Claims, 20 Drawing Sheets

(51) Int. Cl.
   *G06T 3/40* (2006.01)
   *G02B 21/06* (2006.01)
   *G02B 27/10* (2006.01)

(52) U.S. Cl.
   CPC ........ *G02B 27/1066* (2013.01); *G06T 3/4076* (2013.01); *G06T 5/50* (2013.01); *G06T 2207/10056* (2013.01); *G06T 2207/10152* (2013.01); *G06T 2207/20221* (2013.01)

(56) References Cited

U.S. PATENT DOCUMENTS

| | | | |
|---|---|---|---|
| 9,497,379 B2* | 11/2016 | Ou | G02B 21/084 |
| 2014/0118529 A1 | 5/2014 | Zheng et al. | |
| 2014/0126691 A1 | 5/2014 | Zheng et al. | |
| 2015/0036038 A1 | 2/2015 | Horstmeyer et al. | |
| 2015/0054979 A1* | 2/2015 | Ou | G02B 21/084 348/222.1 |
| 2015/0160450 A1* | 6/2015 | Ou | G02B 21/002 348/80 |
| 2016/0088205 A1* | 3/2016 | Horstmeyer | H04N 5/2256 348/80 |
| 2016/0187849 A1* | 6/2016 | Zhang | G02B 21/0016 348/41 |
| 2017/0146788 A1* | 5/2017 | Waller | G06T 5/50 |
| 2017/0363853 A1* | 12/2017 | Besley | G06T 7/521 |

OTHER PUBLICATIONS

Bian, Zichao, Siyuan Dong, and Guoan Zheng. "Adaptive system correction for robust Fourier ptychographic imaging." Optics express 21, No. 26 (2013): 32400-32410.

Ou, Xiaoze, Roarke Horstmeyer, Changhuei Yang, and Guoan Zheng. "Quantitative phase imaging via Fourier ptychographic microscopy." Optics letters 38, No. 22 (2013): 4845-4848.

http://www.youtube.com/watch?feature=player_embedded&v=uSxQ6uVWLNI; pp. 1-32.

Dong, Siyuan, Roarke Horstmeyer, Radhika Shiradkar, Kaikai Guo, Xiaoze Ou, Zichao Bian, Huolin Xin, and Guoan Zheng. "Aperture-scanning Fourier ptychography for 3D refocusing and super-resolution macroscopic imaging." Optics express 22, No. 11 (2014): 13586-13599.

Mico, Vicente, Zeev Zalevsky, Pascuala García-Martínez, and Javier García. "Synthetic aperture superresolution with multiple off-axis holograms." JOSA A 23, No. 12 (2006): 3162-3170.

Maiden, Andrew M., Martin J. Humphry, Fucai Zhang, and John M. Rodenburg. "Superresolution imaging via ptychography." JOSA A 28, No. 4 (2011): 604-612.

Huang, Xiaojing, Hanfei Yan, Ross Harder, Yeukuang Hwu, Ian K. Robinson, and Yong S. Chu. "Optimization of overlap uniformness for ptychography." Optics express 22, No. 10 (2014): 12634-12644.

Dierolf, Martin, Pierre Thibault, Andreas Menzel, Cameron M. Kewish, Konstantins Jefimovs, Iime Schlichting, Konstanze Von Koenig, Oliver Bunk, and Franz Pfeiffer. "Ptychographic coherent diffractive imaging of weakly scattering specimens." New Journal of Physics 12, No. 3 (2010): 035017.

Mohan, Ankit, Xiang Huang, Jack Tumblin, and Ramesh Raskar. "Sensing increased image resolution using aperture masks." In Computer Vision and Pattern Recognition, 2008. CVPR 2008. IEEE Conference on, pp. 1-8. IEEE, 2008.

http://en.wikipedia.org/wiki/Window_function; pp. 1-28; Mar. 30, 2017.

Weixin, J. et al., "Multi-channel super-resolution with Fourier ptychographic microscopy" SPIE/COS Photonics Asia. International Society for Optics and Photonics, 2014.

Levoy, M. et al., "Recording and controlling the 4D light field in a microscope using microlens arrays", The Royal Microscopical Society, Journal of Microscopy, vol. 235, Part 2 2009, pp. 144-162; Received Nov. 7, 2008; accepted Apr. 7, 2009.

* cited by examiner

ILLUMINATION SYSTEMS AND DEVICES FOR FOURIER PTYCHOGRAPHIC IMAGING

REFERENCE TO RELATED PATENT APPLICATION(S)

This application claims the benefit under 35 U.S.C. § 119 of the filing date of Australian Patent Application No. 2014280894, filed Dec. 23, 2014, hereby incorporated by reference in its entirety as if fully set forth herein.

TECHNICAL FIELD

The current invention relates to systems and apparatus for Fourier Ptychographic imaging.

BACKGROUND

Fourier Ptychographic Microscopy (FPM) is a kind of microscopy that forms an image of a specimen using Fourier Ptychographic imaging. This imaging method is based on capturing many lower resolution images under different lighting conditions, and combining them using an iterative computational process to generate a higher resolution image. Although the lower resolution images are real images, the higher resolution image is complex. FPM can achieve a high resolution and a wide field of view simultaneously without moving the specimen relative to the imaging optics.

Virtual microscopy is a technology that gives physicians the ability to navigate and observe a biological specimen at different simulated magnifications and through different two-dimensional (2D) or three-dimensional (3D) views as though they were controlling a microscope. Virtual microscopy can be achieved using a display device such as a computer monitor or tablet with access to a database of images of microscope images of the specimen. There are a number of advantages of virtual microscopy over traditional microscopy. Firstly, the specimen itself is not required at the time of viewing, thereby facilitating archiving, telemedicine and education. Virtual microscopy can also enable the processing of the specimen images to change the depth of field, and to reveal pathological features that would be otherwise difficult to observe by the eye, for example as part of a computer aided diagnosis system.

Conventional capture of images for virtual microscopy is generally performed using a high throughput slide scanner. The specimen is loaded mechanically onto a stage and moved under the microscope objective as images of different parts of the specimen are captured on a sensor. Depth and thickness information for the specimen being imaged are generally required in order to perform an efficient capture.

Any two adjacent images have a region of overlap so that the multiple images of the same specimen can be combined, or spliced, into a 2D layer or a 3D volume in a computer system attached to the microscope. Mosaicing and other software algorithms are used to register both the neighbouring images at the same depth and at different depths so that there are no defects between adjoining images to give a seamless 2D or 3D view. Virtual Microscopy is different from other image mosaicing tasks in a number of important ways. Firstly, the specimen is typically moved by the stage under the optics, rather than the optics being moved to capture different parts of the subject as would take place in a panorama. The stage movement is can be controlled very accurately and the specimen may be fixed in a substrate. The microscope is used in a controlled environment—for example mounted on vibration isolation platform in a laboratory with a custom illumination set up so that the optical tolerances of the system (alignment and orientation of optical components and the stage) are very tight. Therefore, the coarse alignment of the captured tiles for mosaicing can be fairly accurate, the lighting even, and the transform between the tiles well represented by a rigid transform. On the other hand, the scale of certain important features of a specimen can be of the order of several pixels and the features can be densely arranged over the captured tile images. This means that the required stitching accuracy for virtual microscopy is very high. Additionally, given that the microscope can be loaded automatically and operated in batch mode, the processing throughput requirements are also high.

Fourier Ptychographic Microscopy (FPM) is an alternative to the above high throughput slide scanner. FPM can produce a 2D image of a specimen with both a high resolution and wide field of view without transverse motion of the specimen under the objective lens. This is achieved by capturing many lower resolution images of the specimen under different lighting conditions, and combining the captured images using an iterative computational process. Each iteration analyses the set of captured images sequentially to converge towards a high quality higher resolution image. The captured images are combined in the Fourier domain so that there are no image seams in real space. The ability to generate an image without discrete stitching artefacts in the spatial domain in this way is a second advantage of FPM over traditional slide scanners. A third advantage is that the generated image is complex, that is to say it includes phase information.

On the other hand, the capture of the set of images may be slow as the illumination strength may be reduced. Also, the iterative computational process can require significant processing and storage resources in order to achieve an acceptable quality. It is desirable, therefore to develop a system for FPM that is efficient and accurate.

SUMMARY

According to one aspect of the present disclosure there is provided apparatus for forming an image of a substantially translucent specimen. The apparatus includes a variable illuminator configured to illuminate the specimen from a plurality of angles of illumination such that when each angle at a given point on the specimen is mapped to a point on a plane perpendicular to an optical axis, the points on the plane having an increasing density towards an axial position on the plane. A detector configured to acquire a plurality of variably-illuminated, relatively lower-resolution intensity images of the specimen based on light filtered by an optical element. A processor for computationally reconstructing a relatively higher-resolution image of the specimen by iteratively updating overlapping regions of the relatively higher-resolution image in Fourier space with the variably-illuminated, lower-resolution intensity images.

Desirably positions of illumination on the plane map to two-dimensional (2D) spatial frequencies in a Fourier reconstruction space that are approximately evenly spaced.

In another implementation, positions of illumination on the plane map to 2D spatial frequencies in a Fourier reconstruction space such that the density is greater towards the spatial frequency corresponding to the DC term of the Fourier reconstruction.

In a further implementation, positions of illumination on the plane map to 2D spatial frequencies in a Fourier reconstruction space such that the density is greater towards the spatial frequency corresponding to the DC term of the Fourier reconstruction according to a power law.

In yet another implementation, positions of illumination on the plane map to 2D spatial frequencies in a Fourier reconstruction space such that the density is greater towards the spatial frequency corresponding to the DC term of the Fourier reconstruction by the illumination angles being arranged with a substantially regular pattern in a polar coordinate system defined by a radial coordinate that depends on the magnitude of the distance from an optical axis and an angular coordinate corresponding to the orientation of the angle relative to the optical axis.

Desirably, a density of positions of illumination drops substantially to zero outside a circular region.

Preferably the variable illuminator is configured such that positions of illumination on a plane perpendicular to the optical axis are spaced evenly on concentric circles such that the number of angular locations selected around each circle increases monotonically with the radius of the circle.

Alternatively the positions of illumination are defined one or more spiral arrangements.

Most advantageously the iterative updating of the overlapping regions is formed using corresponding regions in Fourier space of the variably-illuminated, relatively low-resolution images.

According to another aspect of the present disclosure the variable illuminator is configured to illuminate the specimen from a plurality of angles of illumination wherein the illumination angles are arranged with a substantially regular pattern in a polar coordinate system defined by a radial coordinate that depends on the magnitude of the distance from an optical axis and an angular coordinate corresponding to the orientation of the angle relative to the optical axis.

With this aspect, positions of illumination are preferably arranged in a plane perpendicular to the optical axis and are spaced evenly on concentric circles such that the number of angular locations selected around each circle increases monotonically with the radius of the circle. Desirably the apparatus further comprises a position of illumination at the centre of the circles.

Also positions of illumination are defined one or more spiral arrangements. In specific implementations, density of positions of illumination drops substantially to zero outside a circular region.

Another aspect is a non-transitory tangible computer readable storage medium having a program recorded thereon, the program being executable by computer apparatus to form an image of a substantially translucent specimen, the program comprising:

code for controlling an illuminator to variably illuminate the specimen from a plurality of angles of illumination such that:

(a) when each angle at a given point on the specimen is mapped to a point on a plane perpendicular to an optical axis, the points on the plane have an increasing density towards an axial position on the plane; or (b) the illumination angles are arranged with a substantially regular pattern in a polar coordinate system defined by a radial coordinate that depends on the magnitude of the distance from an optical axis and an angular coordinate corresponding to the orientation of the angle relative to the optical axis;

code for controlling a detector to acquire a plurality of variably illuminated, relatively lower-resolution intensity images of the specimen based on light emitted from the illuminator according to variable illumination and filtered by an optical element; and code for computationally reconstructing a relatively higher-resolution image of the specimen by iteratively updating overlapping regions of the relatively higher-resolution image in Fourier space with the variably-illuminated, lower-resolution intensity images.

According to another aspect there is disclosed apparatus for forming an image of a substantially translucent specimen, the apparatus comprising:

(a) an imaging system for illuminating and imaging the specimen based on light filtered by an optical element;

(b) a sensor for acquiring a plurality of relatively lower resolution intensity images of the specimen for which content of the images corresponds to partially overlapping regions in a spatial frequency space that are arranged with a substantially regular pattern in a polar coordinate system defined by a radial coordinate that depends on a modulus of spatial frequency, and an angular coordinate which depends on the angle of the radial spatial frequency;

(c) a detector configured to acquire a plurality of relatively lower-resolution intensity images of the specimen based on light filtered by an optical element; and (d) a processor for computationally reconstructing a relatively higher-resolution image of the specimen by iteratively updating overlapping regions of the relatively high-resolution image in Fourier space with the lower-resolution intensity images.

Other aspects are also disclosed.

BRIEF DESCRIPTION OF THE DRAWINGS

At least one embodiment of the invention will now be described with reference to the following drawings, in which.

DETAILED DESCRIPTION INCLUDING BEST MODE

Context

Figure 1:
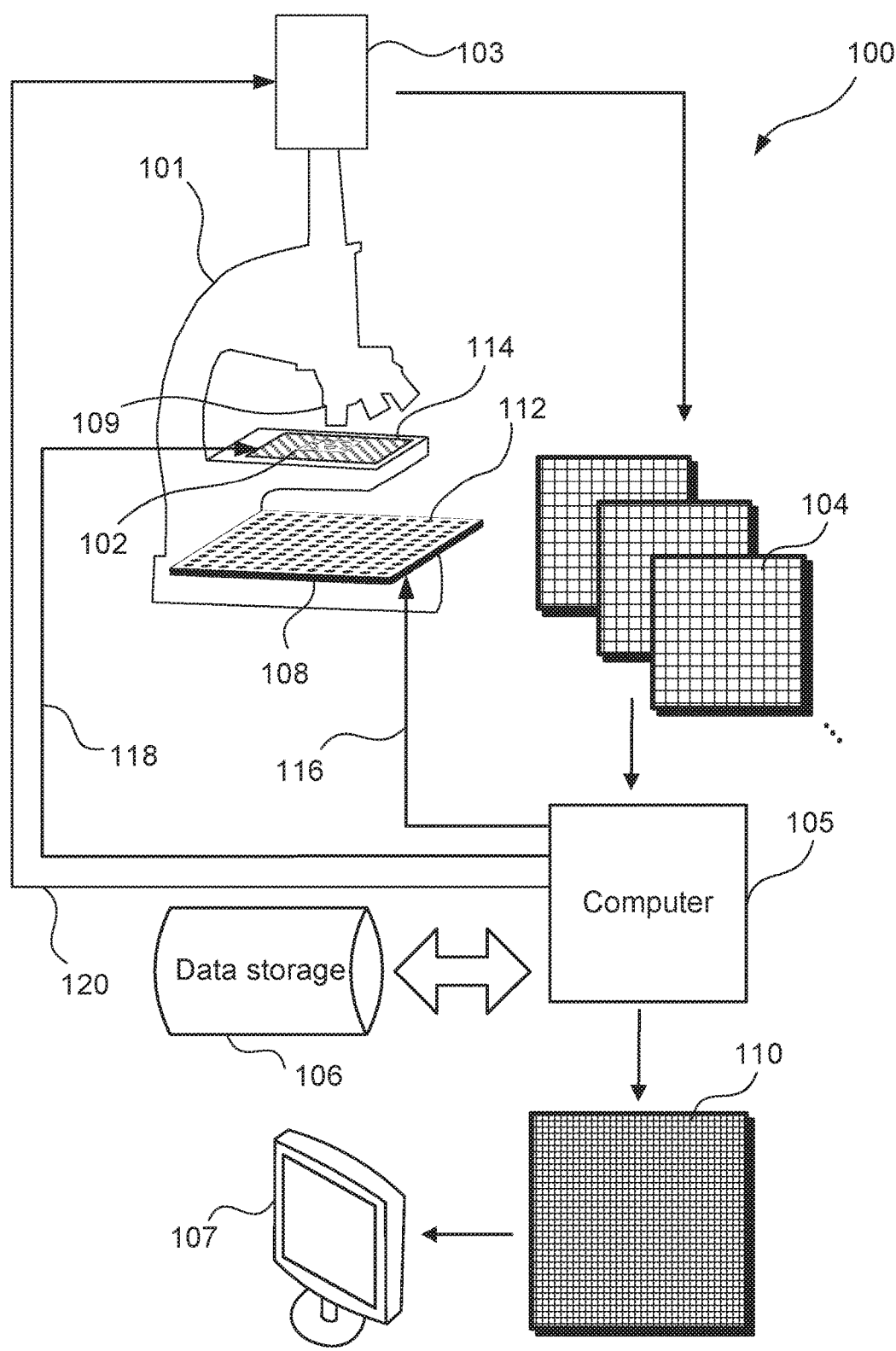
FIG. 1 shows a high-level system diagram for a Fourier Ptychographic Microscopy system.

FIG. 1 shows a high-level system diagram for a microscope capture system 100 suitable for Fourier Ptychographic Microscopy (FPM). A specimen 102 is physically positioned on a stage 114 under an optical element, such as a lens 109, and within the field of view of a microscope 101. The microscope 102 in the illustrated implementation has a stage 114 that may be configured to move in order to correctly place the specimen in the field of view of the microscope at an appropriate depth. The stage 114 may also move as multiple images of the specimen 102 are captured by a camera 103 mounted to the microscope 101. In a standard configuration, the stage 114 may be fixed during image capture of the specimen.

A variable illumination system (illuminator) 108 is positioned in association with the microscope 101 so that the specimen 102 may be illuminated by coherent or partially coherent light incident at different angles. The illuminator 108 typically includes small light emitters 112 arranged at distance from the specimen 102, the distance being large compared to the size of the emitters and also compared to the size of the specimen 102. With such an arrangement, the light emitters 112 act somewhat like point sources, and the light from the emitters 112 approximates plane waves at the specimen 102. An alternate configuration may use larger light emitters and a lens to focus the light to a plane wave. The specimen 102 is typically substantially translucent such that the illuminating light can pass through the specimen 102 and be focussed by the lens 109 of the microscope 101 for detection by the camera 103. The arrangement of the microscope 101, the lens 109 and camera 103 represent a detector that forms an optical axis and is configured to capture or acquire images of the specimen 102 subject to the variable illumination afforded by the illuminator 108.

The microscope 101 forms an image of the specimen 102 on a sensor in the camera 103 by means of an optical system. The optical system may be based on an optical element that may include an objective lens 109 with low numerical aperture (NA), or some other arrangement. The camera 103 captures one or more images 104 corresponding to each illumination configuration. Multiple images may be captured at different stage positions and/or different colours of illumination. The arrangement provides for the imaging of the specimen 102, including the capture and provision of multiple images of the specimen 102 to the computer 105.

The captured images 104, also referred to as relatively low or lower resolution images, are intensity images that may be greyscale images or colour images, depending on the sensor and illumination. The images 104 are passed to a computer system 105 which can either start processing the images immediately or store them in temporary storage 106 for later processing. As part of the processing, the computer 105 generates a relatively high or higher resolution image 110 corresponding to one or more regions of the specimen 102. The higher resolution image may be reproduced upon a display device 107. As illustrated, the computer 105 may be configured to control operation of the individual light emitters 112 of the illuminator 108 via a control line 116. Also, the computer 105 may be configured to control movement of the stage 114, and thus the specimen 102, via a control line 118. A further control line 120 may be used by which the computer 105 may control the camera 103 for capture of the images 104.

The transverse optical resolution of the microscope may be estimated based on the optical configuration of the microscope and is related to the point spread function of the microscope. A standard approximation to this resolution in air is given by:

$$D_r = \frac{0.61\lambda}{NA}, \quad (1)$$

where NA is the numerical aperture, and $\lambda$ is the wavelength of light. A conventional slide scanner might use an air immersion objective lens with an NA of 0.7. At a wavelength of 500 nm, the estimated resolution is 0.4 μm. A typical FPM system would use a lower NA of the order of 0.08 for which the estimated resolution drops to 4 μm.

The numerical aperture of a lens defines a half-angle, $\theta_H$, of the maximum cone of light that can enter or exit the lens. In air, this is defined by:

$$\theta_H = \arcsin(NA), \quad (2)$$

in terms of which the full acceptance angle of the lens can be expressed as $\theta_F = 2\theta_H$.

The specimen 102 being observed may be a biological specimen such as a histology slide consisting of a tissue fixed in a substrate and stained to highlight specific features. Such specimens are substantially translucent. Such a slide may include a variety of biological features on a wide range of scales. The features in a given slide depend on the specific tissue sample and stain used to create the histology slide. The dimensions of the specimen on the slide may be of the order of 10 mm×10 mm or larger. If the transverse resolution of a virtual slide was selected as 0.4 μm, each layer would consist of at least 25,000 by 25,000 pixels.

Computer Implementation

Figure 18A:
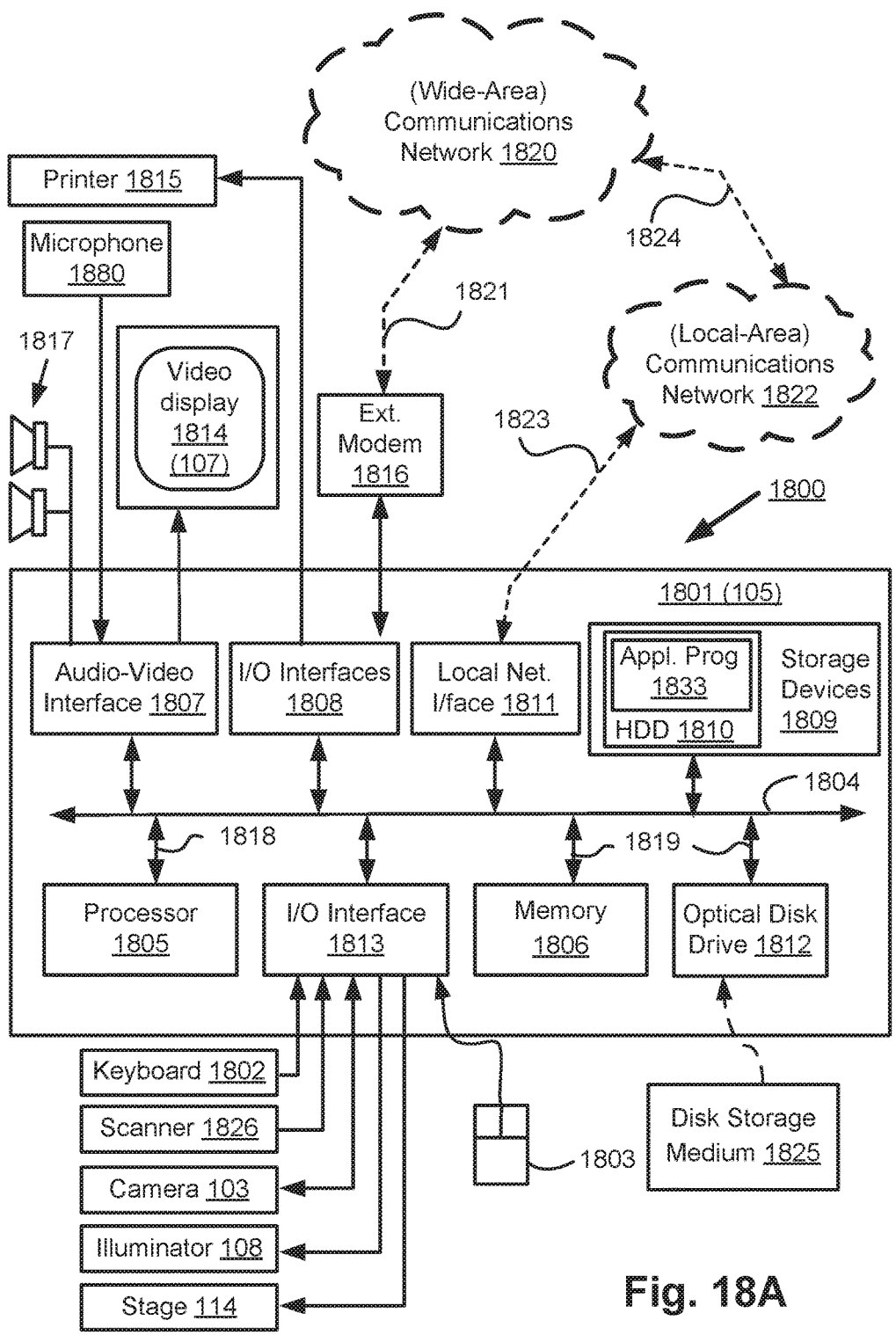
FIGS. 18A and 18B form a schematic block diagram of a general purpose computer system upon which arrangements described can be practiced.
Figure 18B:
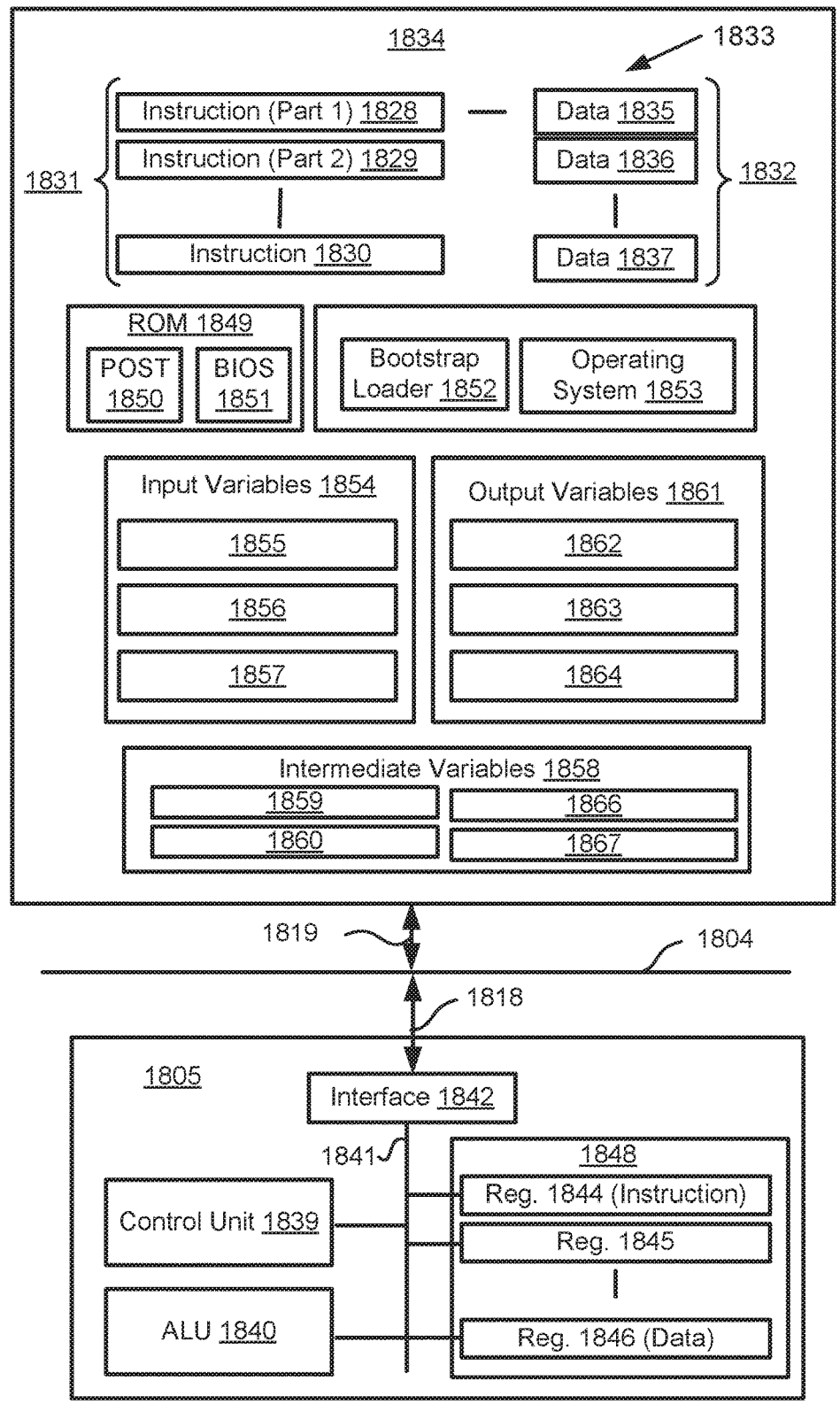

FIGS. 18A and 18B depict a general-purpose computer system 1800, upon which the various arrangements to be described can be practiced. The computer system 1800 is configured to perform the functions and operations of the computer 105, data storage 106, and display device 107 of FIG. 1 and thereby with the microscope 101 form apparatus for ptychographic imaging of biological specimens and the like.

As seen in FIG. 18A, the computer system 1800 includes: a computer module 1801 (105); input devices such as a keyboard 1802, a mouse pointer device 1803, a scanner 1826, the camera 103, and a microphone 1880; and output devices including a printer 1815, a display device 1814 (107) and loudspeakers 1817. An external Modulator-Demodulator (Modem) transceiver device 1816 may be used by the computer module 1801 for communicating to and from a communications network 1820 via a connection 1821. The communications network 1820 may be a wide-area network (WAN), such as the Internet, a cellular telecommunications network, or a private WAN. Where the connection 1821 is a telephone line, the modem 1816 may be a traditional "dial-up" modem. Alternatively, where the connection 1821 is a high capacity (e.g., cable) connection, the modem 1816 may be a broadband modem. A wireless modem may also be used for wireless connection to the communications network 1820.

The computer module 1801 typically includes at least one processor unit 1805, and a memory unit 1806. For example, the memory unit 1806 may have semiconductor random access memory (RAM) and semiconductor read only memory (ROM). The computer module 1801 also includes an number of input/output (I/O) interfaces including: an audio-video interface 1807 that couples to the video display 1814, loudspeakers 1817 and microphone 1880; an I/O interface 1813 that couples to the keyboard 1802, mouse 1803, scanner 1826, camera 103, the illuminator 108, the stage 114, and optionally a joystick or other human interface device (not illustrated); and an interface 1808 for the external modem 1816 and printer 1815. In some implementations, the modem 1816 may be incorporated within the computer module 1801, for example within the interface 1808. The computer module 1801 also has a local network interface 1811, which permits coupling of the computer system 1800 via a connection 1823 to a local-area communications network 1822, known as a Local Area Network (LAN). As illustrated in FIG. 18A, the local communications network 1822 may also couple to the wide network 1820 via a connection 1824, which would typically include a so-called "firewall" device or device of similar functionality. The local network interface 1811 may comprise an Ethernet circuit card, a Bluetooth™ wireless arrangement or an IEEE 802.11 wireless arrangement; however, numerous other types of interfaces may be practiced for the interface 1811.

The I/O interfaces 1808 and 1813 may afford either or both of serial and parallel connectivity, the former typically being implemented according to the Universal Serial Bus (USB) standards and having corresponding USB connectors (not illustrated). Storage devices 1809 are provided and typically include a hard disk drive (HDD) 1810. Other storage devices such as a floppy disk drive and a magnetic tape drive (not illustrated) may also be used. An optical disk drive 1812 is typically provided to act as a non-volatile source of data. Portable memory devices, such optical disks 1825 (e.g., CD-ROM, DVD, Blu ray Disc™), USB-RAM, portable, external hard drives, and floppy disks, for example, may be used as appropriate sources of data to the system 1800. In the arrangement illustrated, the data storage 106 of FIG. 1 may be implemented in whole or part by any one or more of the memory 1806, the HDD 1810, the disk 1825, or the networks 1820 or 1822 when operate as storage servers or the like.

The components 1805 to 1813 of the computer module 1801 typically communicate via an interconnected bus 1804 and in a manner that results in a conventional mode of operation of the computer system 1800 known to those in the relevant art. For example, the processor 1805 is coupled to the system bus 1804 using a connection 1818 Likewise, the memory 1806 and optical disk drive 1812 are coupled to the system bus 1804 by connections 1819. Examples of computers on which the described arrangements can be practised include IBM-PC's and compatibles, Sun Sparcstations, Apple Mac™ or a like computer systems.

The methods of image acquisition to be described may be implemented using the computer system 1800 wherein the processes of FIGS. 3A to 17, may be implemented as one or more software application programs 1833 executable within the computer system 1800. In particular, the steps of the methods of image acquisition are effected by instructions 1831 (see FIG. 18B) in the software 1833 that are carried out within the computer system 1800. The software instructions 1831 may be formed as one or more code modules, each for performing one or more particular tasks. The software may also be divided into two separate parts, in which a first part and the corresponding code modules performs the image acquisition methods and a second part and the corresponding code modules manage a user interface between the first part and the user.

The software may be stored in a computer readable medium, including the storage devices described below, for example. The software is loaded into the computer system 1800 from the computer readable medium, and then executed by the computer system 1800. A computer readable medium having such software or computer program recorded on the computer readable medium is a computer program product. The use of the computer program product in the computer system 1800 preferably effects an advantageous apparatus for ptychographic imaging.

The software 1833 is typically stored in the HDD 1810 or the memory 1806. The software is loaded into the computer system 1800 from a computer readable medium, and executed by the computer system 1800. Thus, for example, the software 1833 may be stored on an optically readable disk storage medium (e.g., CD-ROM) 1825 that is read by the optical disk drive 1812. A computer readable medium having such software or computer program recorded on it is a computer program product. The use of the computer program product in the computer system 1800 preferably effects an apparatus for ptychographic imaging.

In some instances, the application programs 1833 may be supplied to the user encoded on one or more CD-ROMs 1825 and read via the corresponding drive 1812, or alternatively may be read by the user from the networks 1820 or 1822. Still further, the software can also be loaded into the computer system 1800 from other computer readable media. Computer readable storage media refers to any non-transitory tangible storage medium that provides recorded instructions and/or data to the computer system 1800 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1801. Examples of transitory or non-tangible computer readable transmission media that may also participate in the provision of software, application programs, instructions and/or data to the computer module 1801 include radio or infra-red transmission channels as well as a network connection to another computer or networked device, and the Internet or Intranets including e-mail transmissions and information recorded on Websites and the like.

The second part of the application programs 1833 and the corresponding code modules mentioned above may be executed to implement one or more graphical user interfaces (GUIs) to be rendered or otherwise represented upon the display 1814. Through manipulation of typically the keyboard 1802 and the mouse 1803, a user of the computer system 1800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1817 and user voice commands input via the microphone 1880.

FIG. 18B is a detailed schematic block diagram of the processor 1805 and a "memory" 1834. The memory 1834 represents a logical aggregation of all the memory modules (including the HDD 1809 and semiconductor memory 1806) that can be accessed by the computer module 1801 in FIG. 18A.

When the computer module 1801 is initially powered up, a power-on self-test (POST) program 1850 executes. The POST program 1850 is typically stored in a ROM 1849 of the semiconductor memory 1806 of FIG. 18A. A hardware device such as the ROM 1849 storing software is sometimes referred to as firmware. The POST program 1850 examines hardware within the computer module 1801 to ensure proper functioning and typically checks the processor 1805, the memory 1834 (1809, 1806), and a basic input-output systems software (BIOS) module 1851, also typically stored in the ROM 1849, for correct operation. Once the POST program 1850 has run successfully, the BIOS 1851 activates the hard disk drive 1810 of FIG. 18A. Activation of the hard disk drive 1810 causes a bootstrap loader program 1852 that is resident on the hard disk drive 1810 to execute via the processor 1805. This loads an operating system 1853 into the RAM memory 1806, upon which the operating system 1853 commences operation. The operating system 1853 is a system level application, executable by the processor 1805, to fulfil various high level functions, including processor management, memory management, device management, storage management, software application interface, and generic user interface.

The operating system 1853 manages the memory 1834 (1809, 1806) to ensure that each process or application running on the computer module 1801 has sufficient memory in which to execute without colliding with memory allocated to another process. Furthermore, the different types of memory available in the system 1800 of FIG. 18A must be used properly so that each process can run effectively. Accordingly, the aggregated memory 1834 is not intended to illustrate how particular segments of memory are allocated (unless otherwise stated), but rather to provide a general view of the memory accessible by the computer system 1800 and how such is used.

As shown in FIG. 18B, the processor 1805 includes a number of functional modules including a control unit 1839, an arithmetic logic unit (ALU) 1840, and a local or internal memory 1848, sometimes called a cache memory. The cache memory 1848 typically includes a number of storage registers 1844-1846 in a register section. One or more internal busses 1841 functionally interconnect these functional modules. The processor 1805 typically also has one or more interfaces 1842 for communicating with external devices via the system bus 1804, using a connection 1818. The memory 1834 is coupled to the bus 1804 using a connection 1819.

The application program 1833 includes a sequence of instructions 1831 that may include conditional branch and loop instructions. The program 1833 may also include data 1832 which is used in execution of the program 1833. The instructions 1831 and the data 1832 are stored in memory locations 1828, 1829, 1830 and 1835, 1836, 1837, respectively. Depending upon the relative size of the instructions 1831 and the memory locations 1828-1830, a particular instruction may be stored in a single memory location as depicted by the instruction shown in the memory location 1830. Alternately, an instruction may be segmented into a number of parts each of which is stored in a separate memory location, as depicted by the instruction segments shown in the memory locations 1828 and 1829.

In general, the processor 1805 is given a set of instructions which are executed therein. The processor 1805 waits for a subsequent input, to which the processor 1805 reacts to by executing another set of instructions. Each input may be provided from one or more of a number of sources, including data generated by one or more of the input devices 1802, 1803, data received from an external source across one of the networks 1820, 1822, data retrieved from one of the storage devices 1806, 1809 or data retrieved from a storage medium 1825 inserted into the corresponding reader 1812, all depicted in FIG. 18A. The execution of a set of the instructions may in some cases result in output of data. Execution may also involve storing data or variables to the memory 1834.

The disclosed ptychographic imaging arrangements use input variables 1854, which are stored in the memory 1834 in corresponding memory locations 1855, 1856, 1857. The arrangements produce output variables 1861, which are stored in the memory 1834 in corresponding memory locations 1862, 1863, 1864. Intermediate variables 1858 may be stored in memory locations 1859, 1860, 1866 and 1867.

Referring to the processor 1805 of FIG. 18B, the registers 1844, 1845, 1846, the arithmetic logic unit (ALU) 1840, and the control unit 1839 work together to perform sequences of micro-operations needed to perform "fetch, decode, and execute" cycles for every instruction in the instruction set making up the program 1833. Each fetch, decode, and execute cycle comprises:

(i) a fetch operation, which fetches or reads an instruction 1831 from a memory location 1828, 1829, 1830;

(ii) a decode operation in which the control unit 1839 determines which instruction has been fetched; and (iii) an execute operation in which the control unit 1839 and/or the ALU 1840 execute the instruction.

Thereafter, a further fetch, decode, and execute cycle for the next instruction may be executed. Similarly, a store cycle may be performed by which the control unit 1839 stores or writes a value to a memory location 1832.

Each step or sub-process in the processes of FIGS. 3A to 17 is associated with one or more segments of the program 1833 and is performed by the register section 1844, 1845, 1846, the ALU 1840, and the control unit 1839 in the processor 1805 working together to perform the fetch, decode, and execute cycles for every instruction in the instruction set for the noted segments of the program 1833.

Overview

The variable illumination system 108 may be formed using a set of LEDs arranged on a flat substrate, referred to as an LED matrix. The LEDs may be monochromatic or multi-wavelength, for example they may illuminate at 3 separate wavelengths corresponding to red, green and blue light, or they may illuminate at an alternative set of wavelengths appropriate to viewing specific features of the specimen. The appropriate spacing of the LEDs on the substrate depends on the microscope optics and the distance from the specimen 102 to the illumination plane, being that plane defined by the flat substrate supporting the emitters 112. Each emitter 112, operating as a point light source, establishes a corresponding angle of illumination 495 to the specimen 102. Where the distance between the light source 112 and the specimen 102 is sufficiently large, the light emitted from the light source 112 approximates a plane wave. In general, the spacing of the LEDs on the substrate should be chosen so that the difference in angle of illumination arriving from a pair of neighbouring LEDs is less than the acceptance angle $\theta_F$ defined by the numerical aperture of the lens 109 according to Equation 2 above.

Figure 2A:
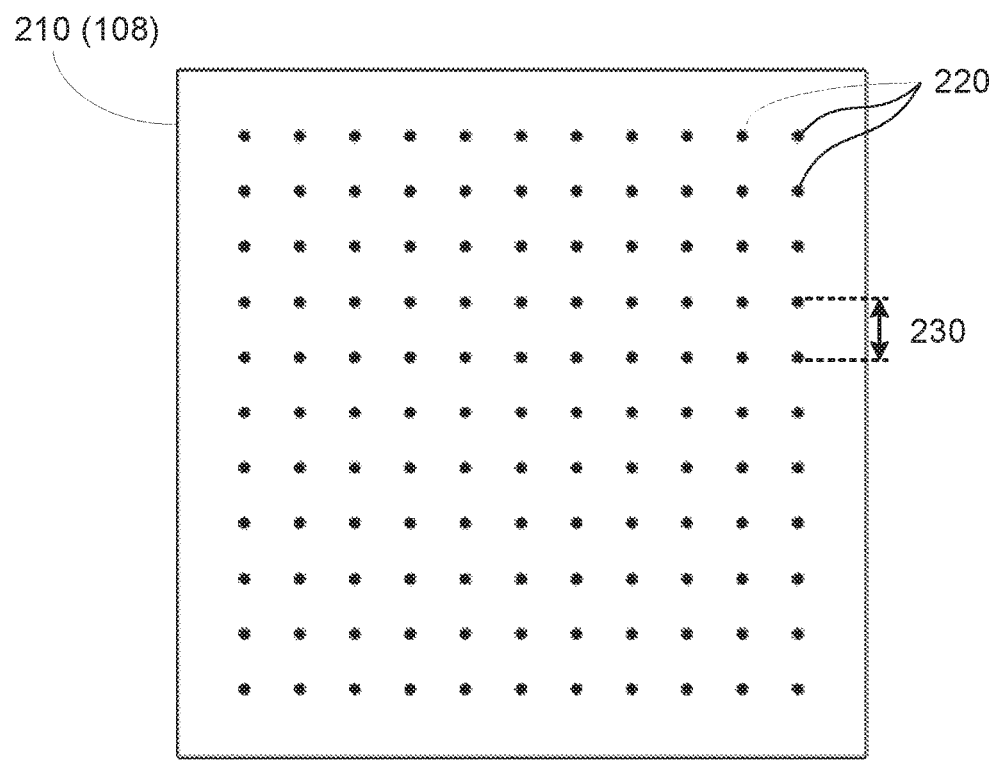
FIGS. 2A and 2B show two prior art variable illuminator designs for a Fourier Ptychographic Microscopy system based on a square lattice and a hexagonal lattice, respectively.
Figure 2B:
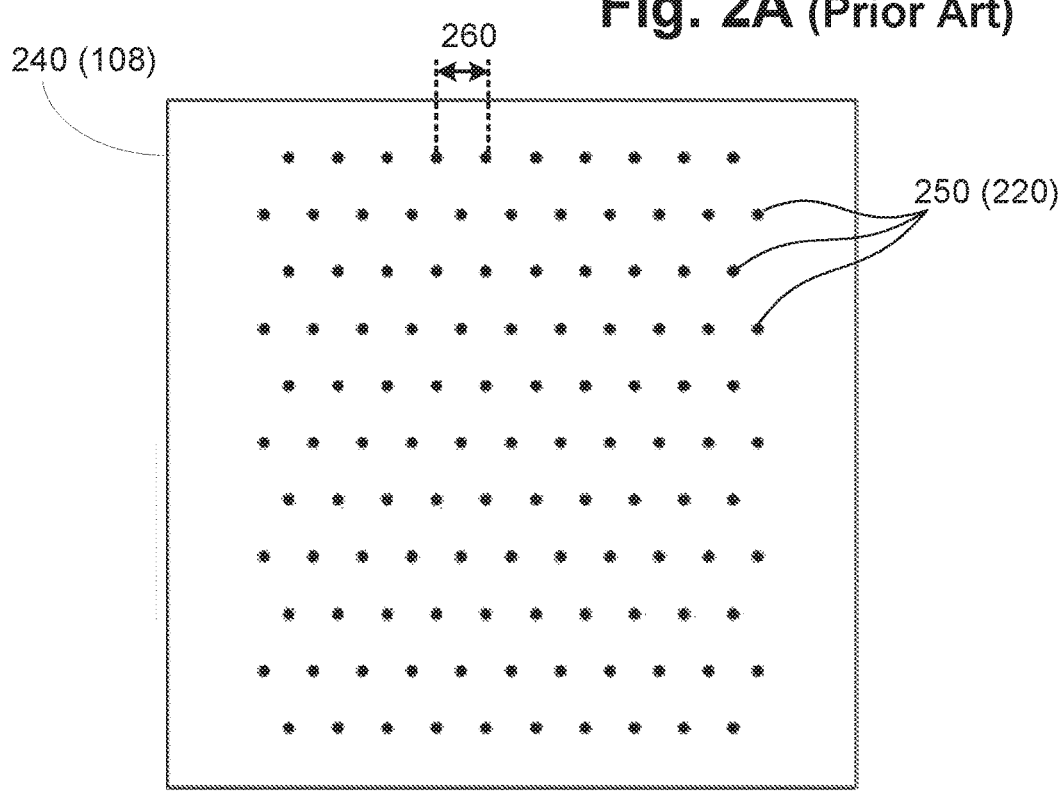

An exemplary illuminator 108 is formed of a set of LEDs forming a matrix capable of illumination at 632 nm, 532 nm and 472 nm with a spacing of approximately 4 mm. The LED matrix is placed 8 cm below the sample stage 114, and cooperates with an optical system with NA of 0.08 and magnification of 2×, and a sensor pixel size of 5.5 μm. FIG. 2A illustrates an LED matrix 210 formed of a square arrangement of 121 LEDs 220, where the LED spacing 230 is indicated. FIG. 2B illustrates an LED matrix 240 formed of a 2D hexagonal lattice arrangement of 115 LEDs 220, where the LED spacing 260 is also indicated.

Alternative variable illumination systems to the LED matrix may be used. For example, various display technologies capable of emitting light from particular locations (pixels) could be used, such as LCD, plasma, OLED, SED, CRT or other display technology. Also, the variable illumination may be achieved by mechanically moving a light source such as an LED to a variety of locations, or even by a combination of mechanical motion, multiple sources, and display technology.

Figure 3A:
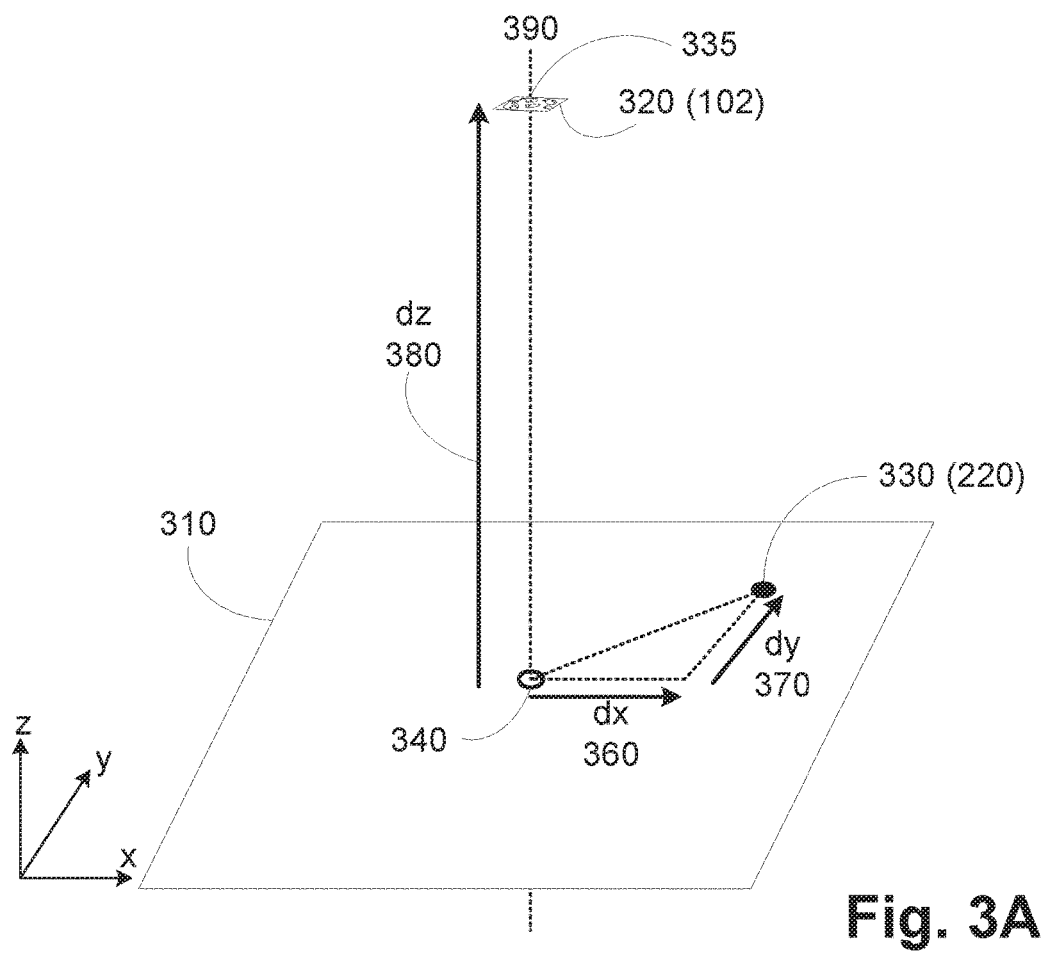
FIGS. 3A and 3B illustrate the relative geometry of a small light source (such as an LED) 330, a specimen 380 and the optical axis 390 of the microscope 101.
Figure 3B:
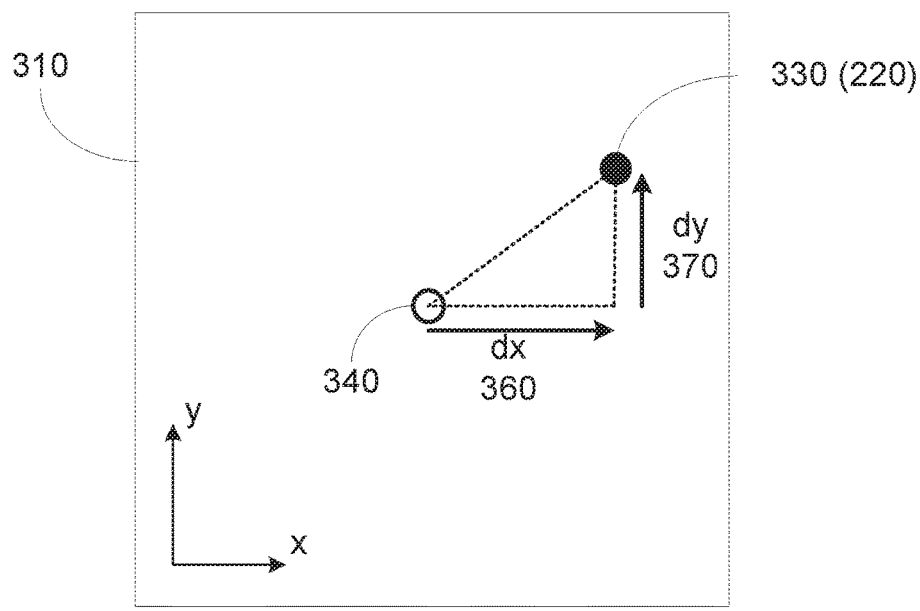
Figure 4:
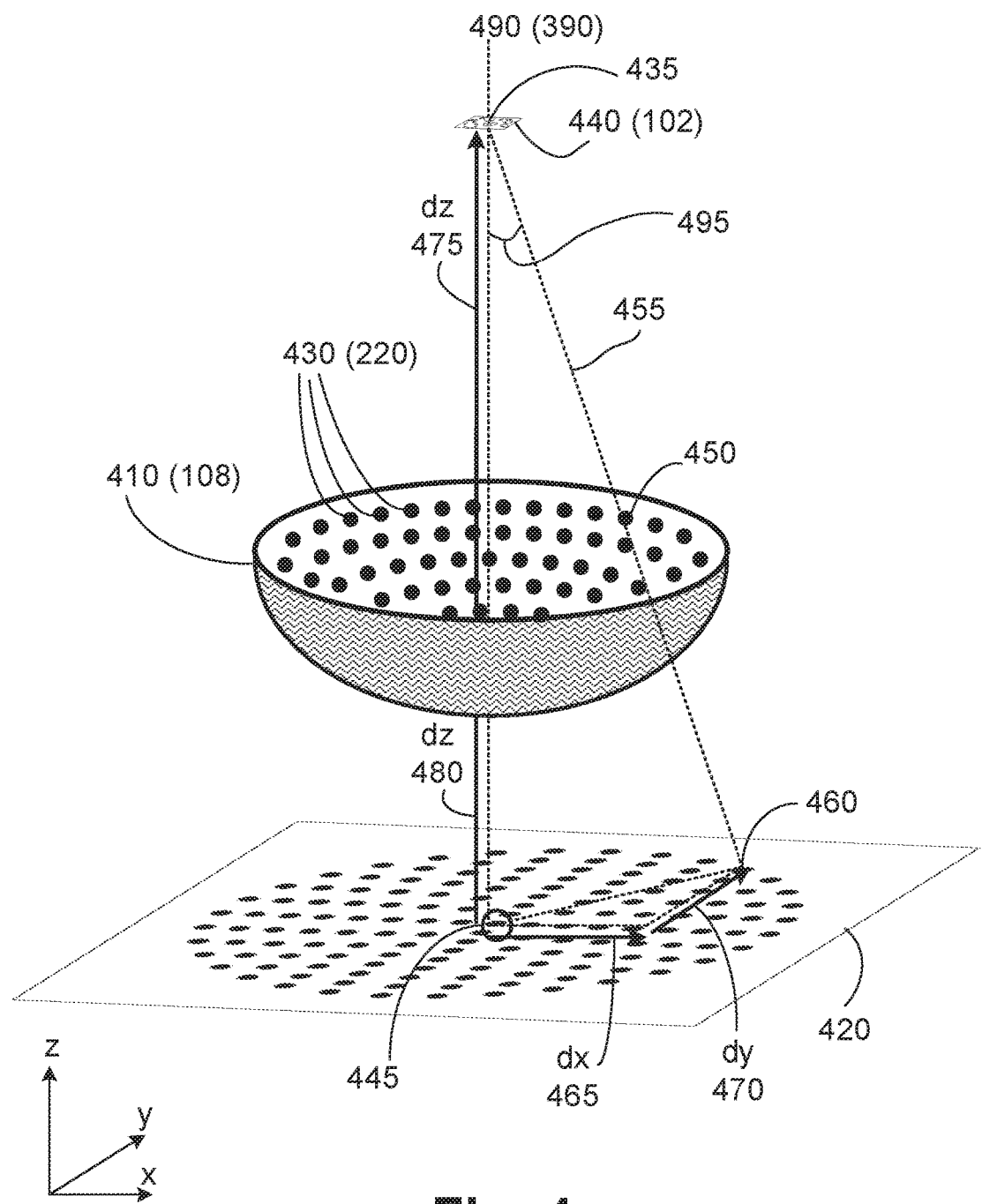
FIG. 4 illustrates a variable illumination system 108 for FPM that is not flat, taking the form of a hemisphere 410.

FIG. 3A illustrates the relative geometry of a small light source (such as an LED) 330 (220), a specimen 380 (102), and the optical axis 390 of the microscope 101, which is typically coincident with an optical axis of the camera 103. A plane 310 can be constructed that is perpendicular to the optical axis 390 of the microscope 101 and includes the light source 330. If a flat LED matrix is used as the variable illuminator 108 then the plane 310 and the LED matrix should be roughly coincident. The optical axis 390 may be considered to define a z-axis, and the x- and y-axes may be defined on the plane 310. Ideally the x- and y-axes should be selected to coincide with the axes of the sensor in the camera 103. The position of the light source 330 may then be defined in terms of the axis relative to a point on the specimen 335 and the corresponding point 340 projected along the optical axis 390 to the plane 310. The point 340 may be referred to as the DC point, and the light arriving at the specimen point 335 from a light source at this position propagates along the optical axis 390. The light source position is indicated by three offsets dx 360, dy 370, and dz 380. FIG. 3B illustrates the geometry of FIG. 3A in the plane 310 transverse to the optical axis 390.

The variable illumination system 108 is not constrained to be flat. The illumination system 108 may take some non-flat geometry, such as the hemisphere 410 illustrated in FIG. 4. The hemisphere 410 may be covered or otherwise populated by a discrete set of light sources 430 (220). It is possible to construct a plane 420 perpendicular to the optical axis 490 (390) at a distance dz 480 that may be the same as the axial distance to one of the light sources (380 of FIG. 3), but can be at a different distance. A point 435 on the specimen 440 is projected along the optical axis 490 to the plane 420 to intersect it at an axial position 445. The axial position 445 may be referred to as the DC point, and the light arriving at the specimen point 435 from a light source at this position propagates along the optical axis 490. The position of each light source 450 may be projected along a line 455 joining the light source 450 and the point on the specimen 435 to a point 460 on the projected plane 420. This point can be defined in terms of the x-, y- and z-axis in terms of three offsets dx 465, dy 470, and dz 475 which are a generalisation of 360, 370 and 380 above for a projected plane. The line 455 and the optical axis 490 subtend an angle of illumination 495 associated with the light source 450.

A normalised offset vector may be formed for the offset vector of the $i^{th}$ angled illumination in $(dx_i, dy_i, dz_i)$ by dividing by the distance from the specimen point to the point on the plane corresponding to the illumination (i.e. from 435 to 420, or from 335 to 330):

$$(\hat{dx_i}, \hat{dy_i}, \hat{dz_i}) = \frac{1}{\sqrt{(dx_i^2 + dy_i^2 + dz_i^2)}}(dx_i, dy_i, dz_i). \quad (3)$$

Using this approach, it is thereby possible to define the wavevector of the $i^{th}$ angled illumination as the product of the normalised offset vector for this illumination and the wavenumber of illumination in vacuum, $k_0 = 2\pi/\lambda$:

$$(k_x^i, k_y^i, k_z^i) = k_0(\hat{dx_i}, \hat{dy_i}, \hat{dz_i}) \quad (4)$$

Figure 14A:
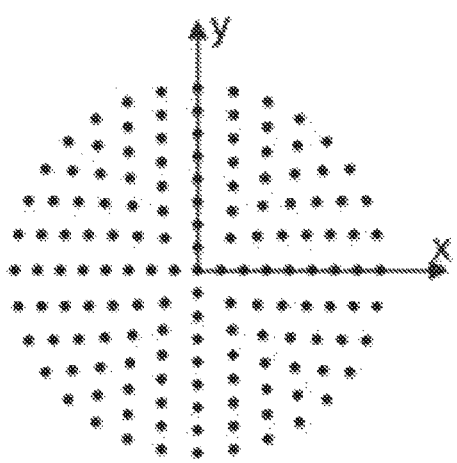
FIGS. 14A to 14F illustrate spatial arrangements of light sources as projected on a plane perpendicular to the optical axis and the corresponding transverse wavevectors.
Figure 14B:
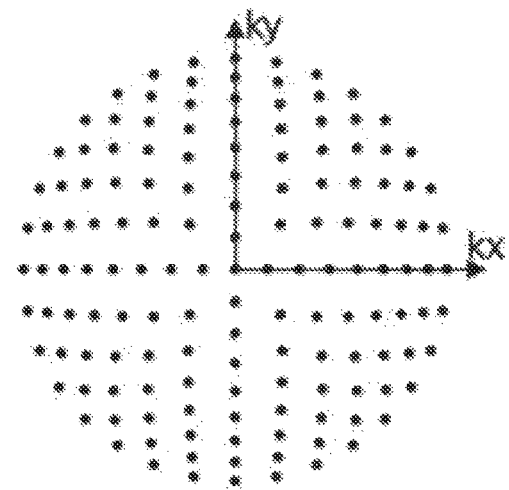

The projected positions (460 of FIG. 4) for an LED matrix with 169 LEDs is illustrated in FIG. 14A, and the corresponding transverse (i.e. 2D) wavevectors $(k_x^i, k_y^i)$ are shown in FIG. 14B. If the distance dz is large relative to the specimen size then the illumination approximates to plane waves at the specimen with no curvature, and the transverse wavevectors are fairly constant across the specimen.

It is helpful to consider aspects of the optical system in Fourier space. Two-dimensional (2D) Fourier space is a space defined by a 2D Fourier transform of the 2D real space in which the captured images are formed, or the transverse spatial properties of the specimen may be defined. The coordinates in this Fourier space are the transverse wavevectors $(k_x, k_y)$. The transverse wavevectors represent the spatial frequency of the image, with low frequencies (at or near zero) being toward the centre of the coordinate representation (e.g. FIG. 14B) and higher frequencies being toward the periphery of the coordinate representation. The terms transverse wavevector' and 'spatial frequency' are used interchangeably in this description. The terms radial transverse wavevector and radial spatial frequency are likewise interchangeable.

Each lower resolution capture image is associated with a region in Fourier space defined by the optical transfer function of the optical element and also by the angle of illumination set by the variable illuminator. For the case where the optical element is an objective lens, the region in Fourier space can be approximated as a circle of radius $r_k$ defined by the product of the wavenumber of illumination in vacuum, $k_0 = 2\pi/\lambda$, and the numerical aperture:

$$r_k = k_0 NA. \quad (5)$$

Figure 10A:
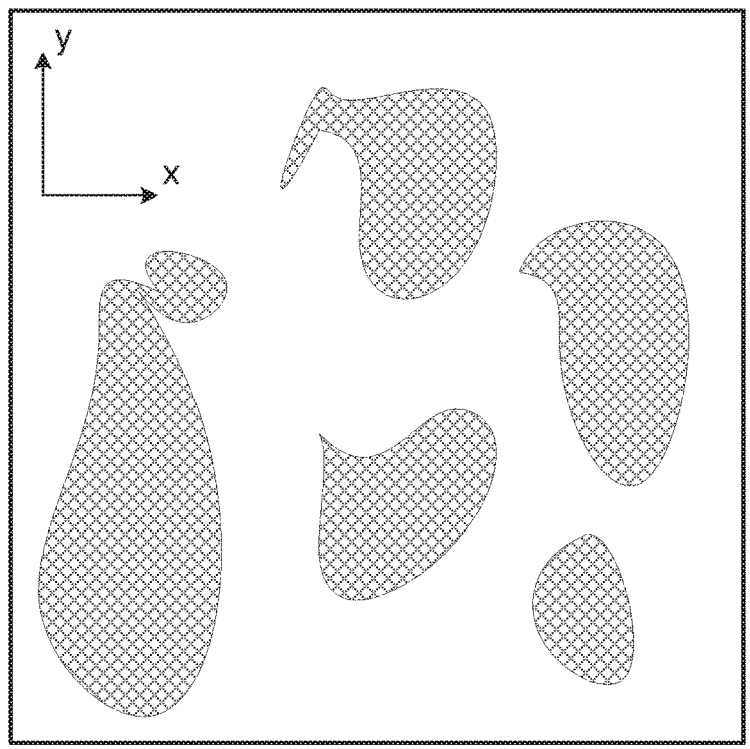
FIGS. 10A and 10B illustrate respectively the real space and Fourier space representations of a specimen.
Figure 10B:
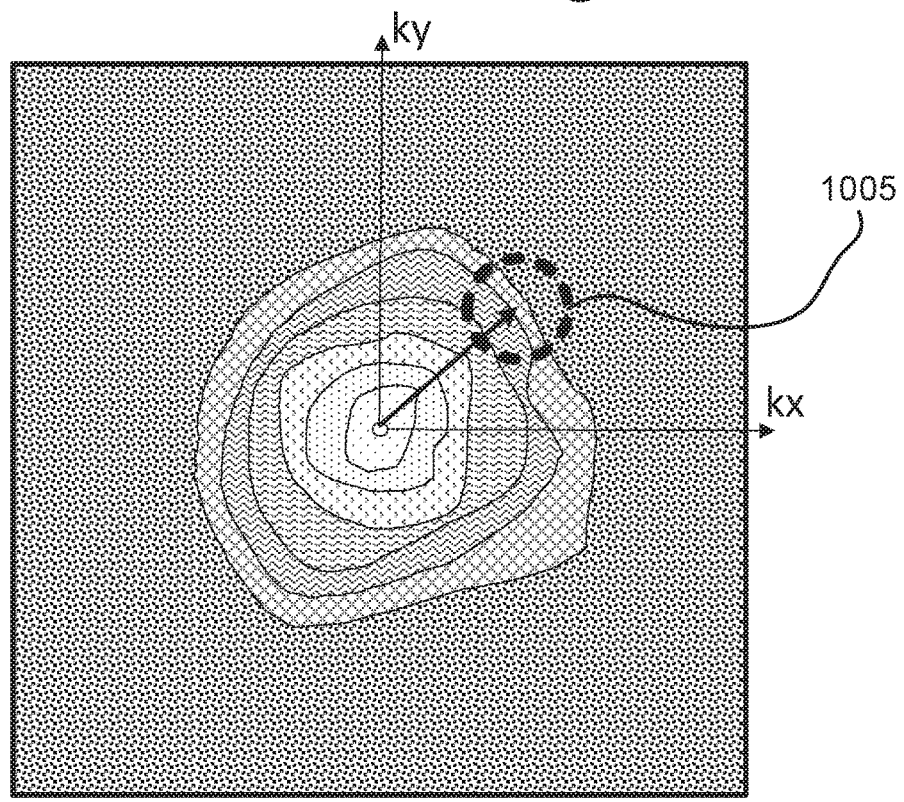

The position of the circular region is offset according to the angle of illumination. For the $i^{th}$ illumination angle, the offset is defined by the transverse components of the wavevector $(k_x^i, k_y^i)$. This is illustrated in FIGS. 10A and 10B which show real space and Fourier space representations of a specimen respectively. The dashed circle in FIG. 10B represents the region associated with a single capture image with an illumination for which the transverse wavevector is shown by the solid arrow of FIG. 10B. The transverse wavevectors ($k_x^i$, $k_y^i$) may be considered as representing the light source position on a synthetic aperture.

In an alternative mode of Fourier Ptychographic imaging, lower resolution capture images may be obtained using a shifted aperture as an optical element (also referred to as aperture-scanning) rather than angled illumination. In this arrangement, the sample is illuminated using a single plane wave incident approximately along the optical axis. The aperture is set in the Fourier plane of the imaging system and the aperture moves within this plane, perpendicular to the optical axis. This kind of scanning aperture may be achieved using a high NA lens with an additional small scanning aperture that restricts the light passing through the optical system. The aperture in such a scanning aperture system may be considered as selecting a region in Fourier space represented by the dashed circle in FIG. 10B outside which the spectral content is blocked. The size of the dashed circle in FIG. 10B corresponds to the small aperture of a low NA lens. The transverse wavevector ($k_x^i$, $k_y^i$) may be considered as representing the shifted position of the aperture rather than the transverse wavevector of angled illumination. It is noted that a spatial light modulator in the Fourier plane may be used rather than a scanning aperture to achieve the same effect. An example of a spatial light modulator is an liquid crystal display (LCD) for which individual pixels or groups of pixels can be switched from transparent to opaque, thereby spatially modulating the passage of light through the display.

Figure 5:
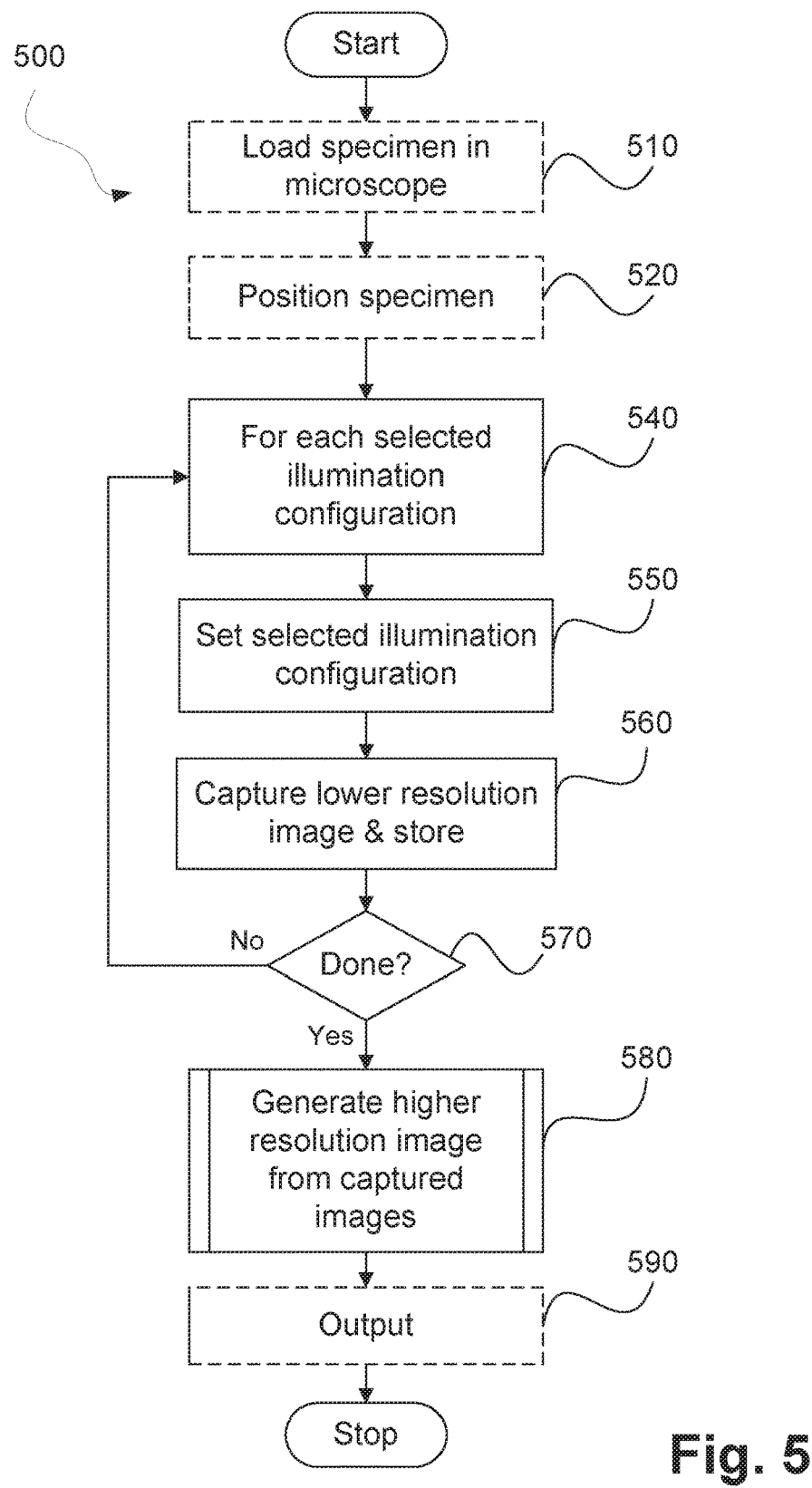
FIG. 5 is a schematic flow diagram of a process 500 that generates a higher resolution image of a specimen by Fourier Ptychographic imaging according to the present disclosure.

A general overview of a process 500 that can be used to generate a higher resolution image of a specimen by Fourier Ptychographic imaging is shown in FIG. 5. The process 500 includes various steps some of which may be manually performed, or automated, and certain processing steps, that may be performed using the computer system 1800. Such processing is typically controlled via a software applications executable by the processor upon the computer 1801 to perform the Ptychographic imaging.

In the process 500, at step 510, a specimen may optionally be loaded onto the microscope stage 114. Such loading may be automated. In any event, a specimen 102 is required to be positioned for imaging. Next, at step 520, the specimen may be moved to be positioned such that it is within the field of view of the microscope 101 around its focal plane. Such movement is optional and where implemented may be manual, or automated with the stage under control of the computer 1801. Next, with a specimen appropriately positioned, steps 540 to 560 define a loop structure for capturing and storing a set of images of the specimen for a predefined set of illumination configurations. In general this will be achieved by illuminating the specimen from a specific position or at a specific angle. In the case that the variable illuminator 108 is formed of a set of LEDs such as an LED matrix, this may be achieved by switching on each individual LED in turn. The order of illumination may be arbitrary, although it is preferable to capture images in the order in which they will be processed (which may be in order of increasing angle of illumination). This minimises the delay before processing of the captured images can begin if the processing is to be started prior to the completion of the image capture. The predetermined set of illumination configurations that may be used will be discussed further with reference to FIGS. 11 to 16.

Step 550 sets the next appropriate illumination configuration, then at step 560 a lower resolution image 104 is captured on the camera 103 and stored on data storage 106 (1810). The image 104 may be a high dynamic range image, for example a high dynamic range image formed from one or more images captured over different exposures times. Appropriate exposure times can be selected based on the properties of the illumination configuration. For example, if the variable illuminator is an LED matrix, these properties may include the illumination strength of the LED switched on in the current configuration.

Step 570 checks if all the illumination configurations have been selected, and if not processing returns to step 540 for capture at the next configuration. Otherwise when all desired configurations have been captures, the method 500 continues to step 580. At step 580 the processor 1805 operates to generate a higher resolution image from the set of lower resolution captured images 104. This step will be described in further detail with respect to FIG. 6 below. The higher resolution image is then optionally output at step 590, completing process 500. Output of the higher resolution image may include storage of the image on a non-transitory computer readable medium, display of the image on the display device 1814, printing the image on the printer 1815, or communication of the image for remote storage, display or printing.

Figure 6:
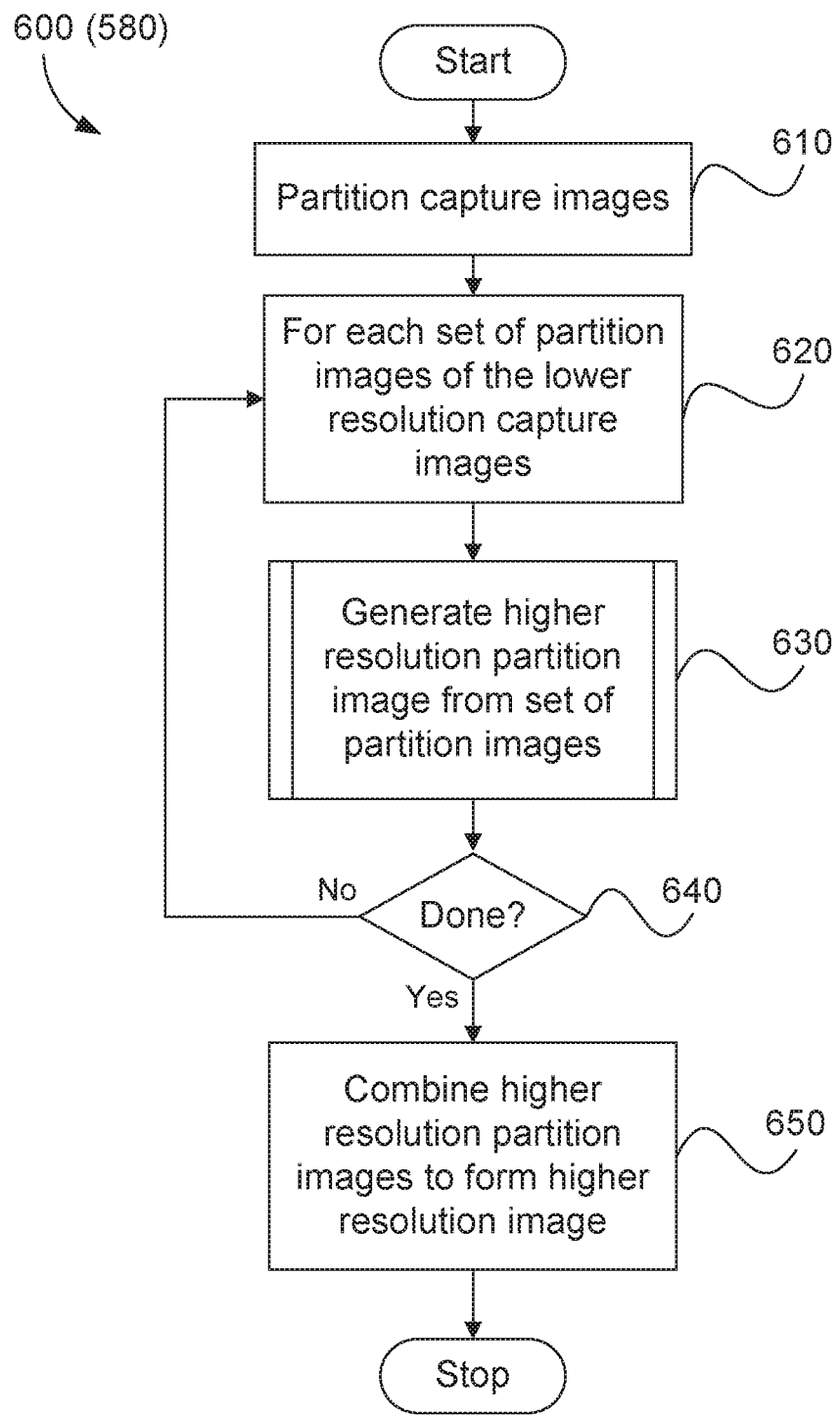
FIG. 6 is a schematic flow diagram of a method of generating a higher resolution image 110 from the set of lower resolution captured images 104.

A method 600, used at step 580 to generate a higher resolution image 110 from the set of lower resolution captured images 104 will now be described in further detail below with reference to FIG. 6. The method 600 is preferably performed by execution of a software application by the processor 1805 operating upon images stored in the HDD 1810, whilst using the memory 1806 for intermediate temporary storage.

Figure 7A:
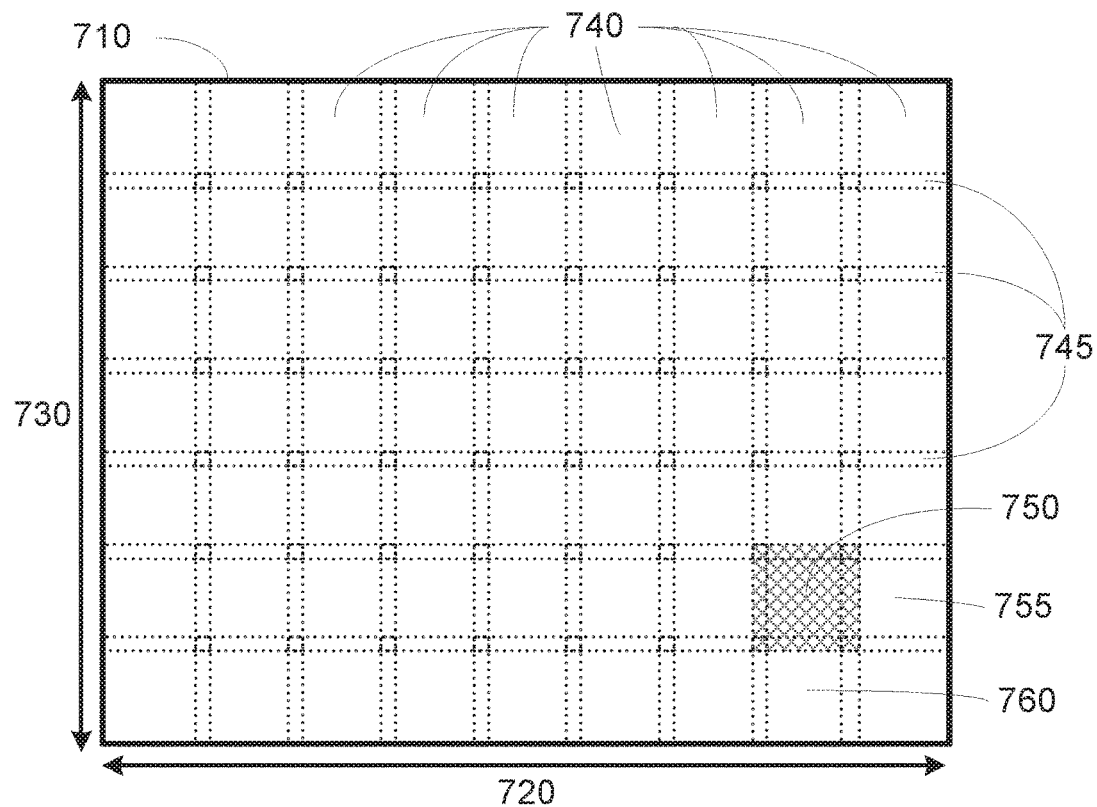
FIGS. 7A and 7B illustrate an exemplary partitioning of the images that may be used at step 610 of method 600.
Figure 7B:
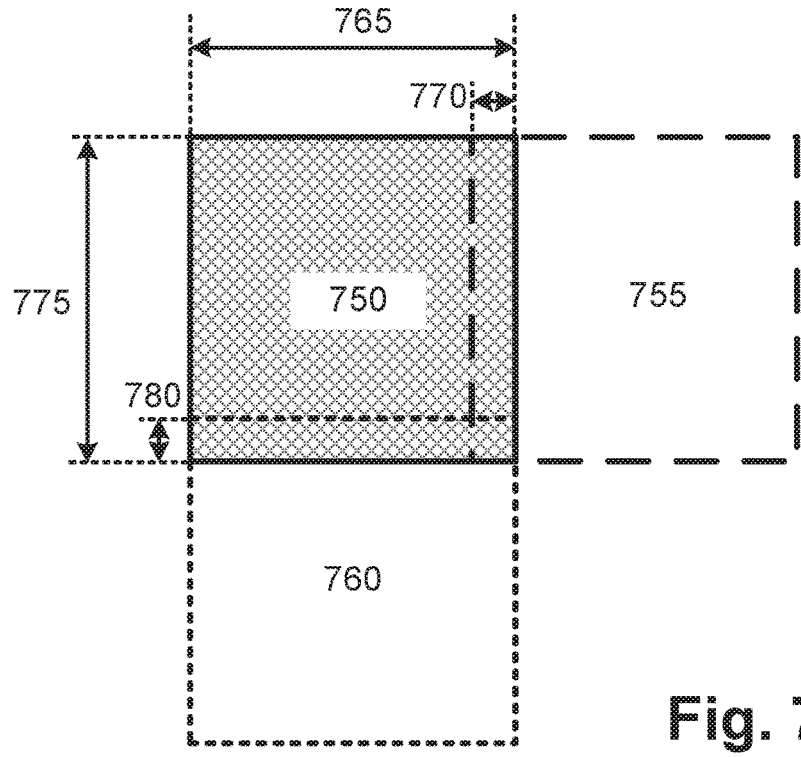

Method 600 starts at step 610 where the processor 1805 retrieves a set of captured images 104 of the specimen 102 and partitions each of the captured images 104. FIGS. 7A and 7B illustrate a suitable partitioning of the images. The rectangle 710 in FIG. 7A represents a single lower resolution capture image 104 of size formed by a width 720 and a height 730. The sizes would typically correspond to the resolution (e.g. 5616 by 3744 pixels) of the sensor in the camera 103. In step 610, the rectangle 710 may be partitioned into equal sized square regions 740 on a regular grid with an overlap between each pair of adjacent partitions 745. The cross hashed partition 750 is adjacent to partition 755 on the right and 760 below, and an expanded view of these three partitions is shown in FIG. 7B. Each partition has size 765 by 775 where suitable sizes may both be 150×150 pixels. The overlapping regions in the x- and y-dimensions are illustrated by 770 and 780 for which a suitable size may be 10 pixels.

The overlapping regions may take different sizes over the capture images 104 in order for the partitioning to cover the field of view exactly. Alternatively, the overlapping regions may be fixed in which case the partitioning may omit a small region around the boundary of the capture images 710. The size of each partition and the total number of partitions may be varied to optimise the overall performance of the system in terms of memory use and processing time. A set of partition images is formed corresponding to the geometry of a partition region applied to each of the set of lower resolution capture images. For example, the partition 750 may be selected from each capture image to form one such set of partitions.

Steps 620 to 640 define a loop structure that processes the sets of partitions of the lower resolution images in turn. The sets of partitions may be processed in parallel for faster throughput. Step 620 select the next set of lower resolution partitions of the capture images. Step 630 then generates a higher resolution partition image from the set of partition images. Each higher resolution partition image may be temporarily stored in memory 1806 or 1810. This step will be described in further detail with respect to FIG. 8 below. Each higher resolution partition image is essentially a partition corresponding to a corresponding region 740 of each of the lower resolution capture images, but at a higher resolution. Step 640 checks if all sets of partition images of the lower resolution capture images have been processed, and if so processing continues to step 650, otherwise processing returns to step 620.

At step 650, the set of higher resolution partition images are combined to form a single higher resolution image 110. A suitable method of combining the images may be understood with reference to FIG. 7A. A higher resolution image corresponding to the capture image field of view covered by the partition sets is defined, where the higher resolution image is upscaled relative to the capture image by the same factor as the upscaling of the higher resolution partition images relative to the lower resolution capture partition images. Each higher resolution partition image is then composited by the processor 1805 onto the higher resolution image at a location corresponding to the lower resolution partition location upscaled in the same ratio. Efficient compositing methods exist that may be used for this purpose. Ideally, the compositing should blend the content of the adjacent high resolution partition images in the overlapping regions given by the upscaled equivalent of regions 745. This completes the processing of method 600.

Figure 19A:
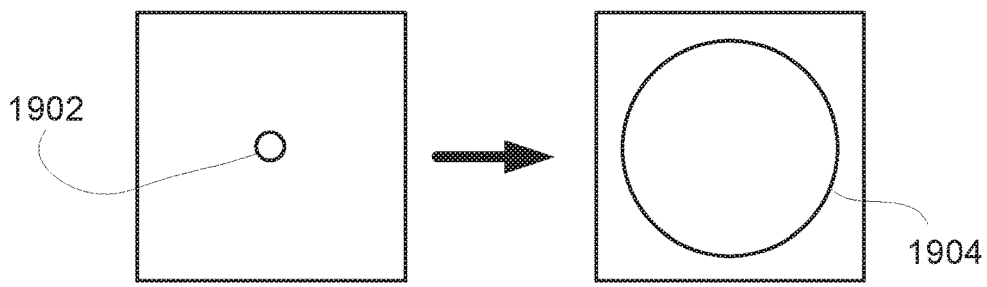
FIGS. 19A to 19C illustrate arrangements operative in Fourier space for processing individual spectral regions.
Figure 19B:
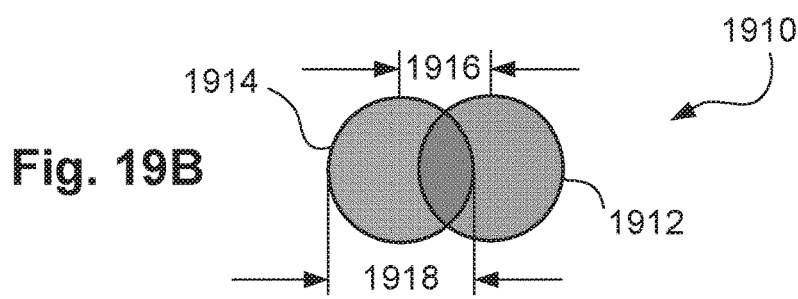

The arrangements described herein are operative to provide for a relatively inexpensive optical system (e.g. low NA lens, small aperture) which provides for a relatively low or lower resolution, as represented by a small circle 1902 in the Fourier representation of FIG. 19A, to emulate a relatively high or higher resolution system (e.g. high NA lens), as depicted by the large circle 1904 also seen in FIG. 19A. This is achieved by mapping, in the Fourier space, spectral regions according to a pattern and using relationships between adjacent regions in the pattern to form a high-resolution image. FIG. 19B shows two overlapping circles, where each circle is a spectral region representative of the Fourier components of a corresponding (relatively low resolution) captured image at a particular illumination angle.

Figure 19C:
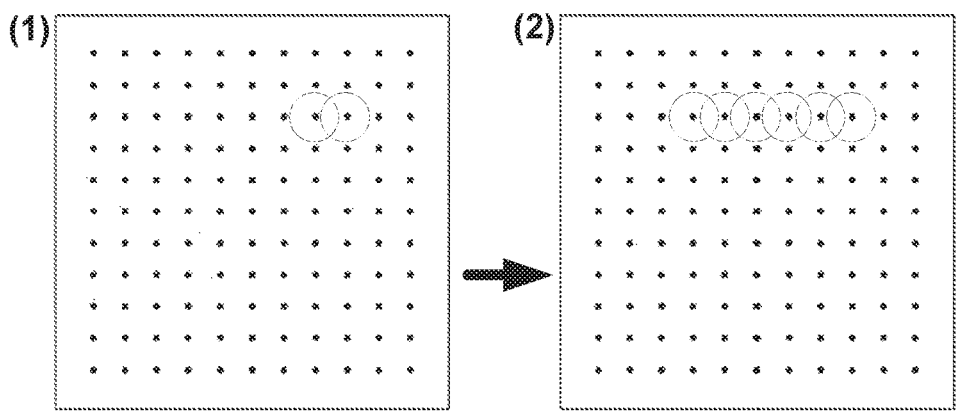
Figure 19C:
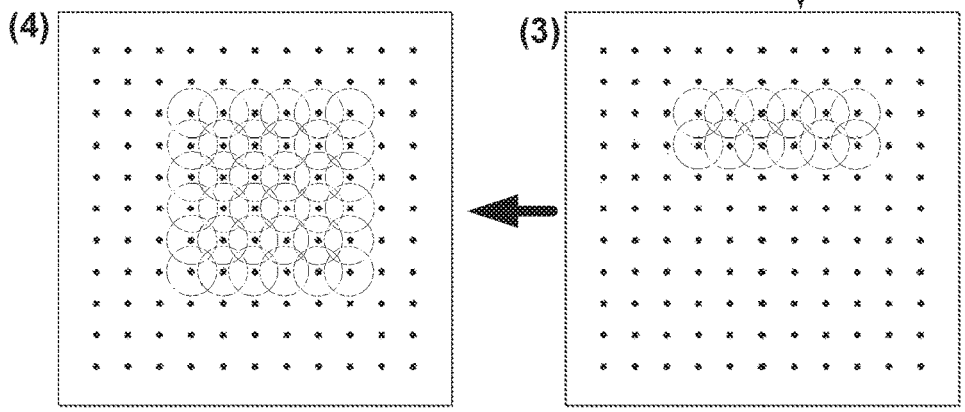

The width 1918 of each circle corresponds to the acceptance angle $\theta_F$ of the lens or other optical component, and the shift 1916 between the adjacent circles is determined by the illumination angle, or more particularly the difference in the illumination angles of the captured images. FIG. 19C has parts (1) to (4) that show how multiple circles (from corresponding captured images) may be progressively mapped into an overlapping matrix to provide for emulating the relatively large acceptance angle of the large circle 1904 seen in FIG. 19A. Fourier space, in which processing according to the presently described arrangements is perform is defined in terms of transverse wavevector, which is related to the angle through a mapping.

Figure 8:
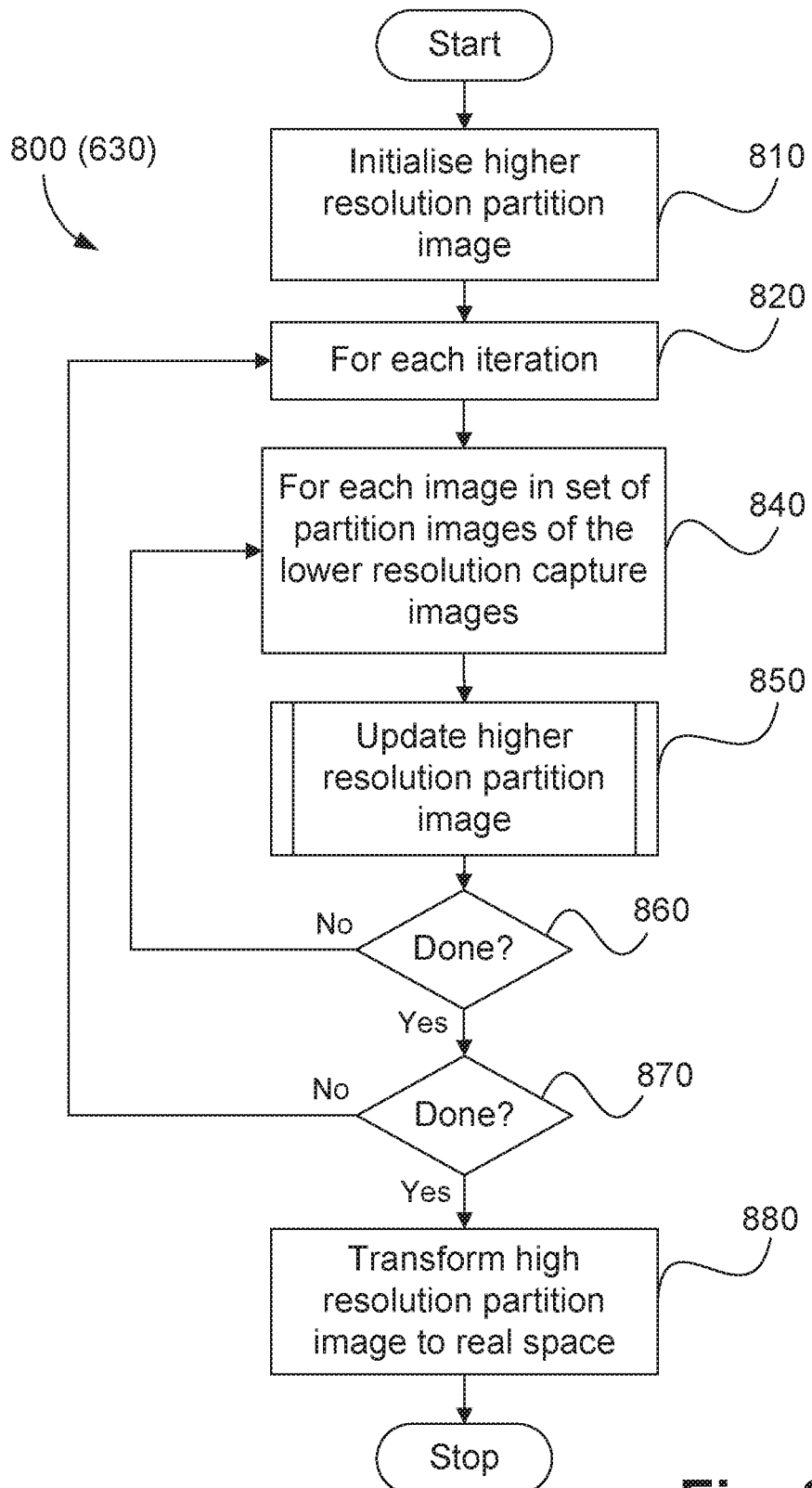
FIG. 8 is a schematic flow diagram of a method of generating a higher resolution partition image from set of lower resolution partition images.

Method 800, used at step 630 to generate a higher resolution partition image from set of lower resolution partition images, will now be described in further detail below with reference to FIG. 8. The method 800 is preferably implemented using software executable by the processor 1805.

First at step 810, a higher resolution partition image is initialised by the processor 1805. The image is defined in Fourier space, with a pixel size that is preferably the same as that of the lower resolution capture images transformed to Fourier space by a 2D Fourier transform. It is noted that each pixel of the image stores a complex value with a real and imaginary component. The initialised image should be large enough to contain all of the Fourier space regions corresponding to the variably illuminated lower resolution capture images, such as the region illustrated by the dashed circle in FIG. 10B. The transverse wavevectors ($k_x^i$, $k_y^i$) corresponding to an LED matrix with 169 LEDs are illustrated in FIG. 11B. In this case the higher resolution partition image needs to large enough to contain an appropriate Fourier space region around each of the transverse wavevectors. For the case of an objective lens, with circular Fourier space regions of radius $r_k$, the higher resolution partition image should cover the convex hull of the set of transverse wavevectors in FIG. 11B dilated by the radius of the regions $r_k$.

It is noted that in alternative implementations, the higher resolution partition image may be generated with a size that can dynamically grow to include each successive Fourier space region as the corresponding lower resolution capture image is processed.

Once the higher resolution partition image has been initialised in step 810, steps 820 to 870 loop over a number of iterations. The iterative updating is used to resolve the underlying phase of the image data to reduce errors in the reconstructed high-resolution images. The number of iterations may be fixed, preferably somewhere between 4 and 15, or it may be set dynamically by checking a convergence criteria for the reconstruction algorithm.

Step 820 starts the next iteration, then steps 840 to 860 step through the images of the set of partition images of the lower resolution capture images generated at step 610. Step 840 selects the next image from the set, and then step 850 updates the higher resolution partition image based on the currently selected lower resolution partition image of the set. This step will be described in further detail with respect to FIG. 9 below. Processing then continues to step 860 which checks if all images in the set have been processed, then returns to step 840 if they have not, or continues to step 870 where they have. From step 870, processing returns to step 820 if there are more iterations to perform, or continues to step 880 if the iterations are complete.

The final step 880 of method 800 involves the processor 1805 performing an inverse 2D Fourier transform on the higher resolution partition image to transform it back to real space.

Figure 9:
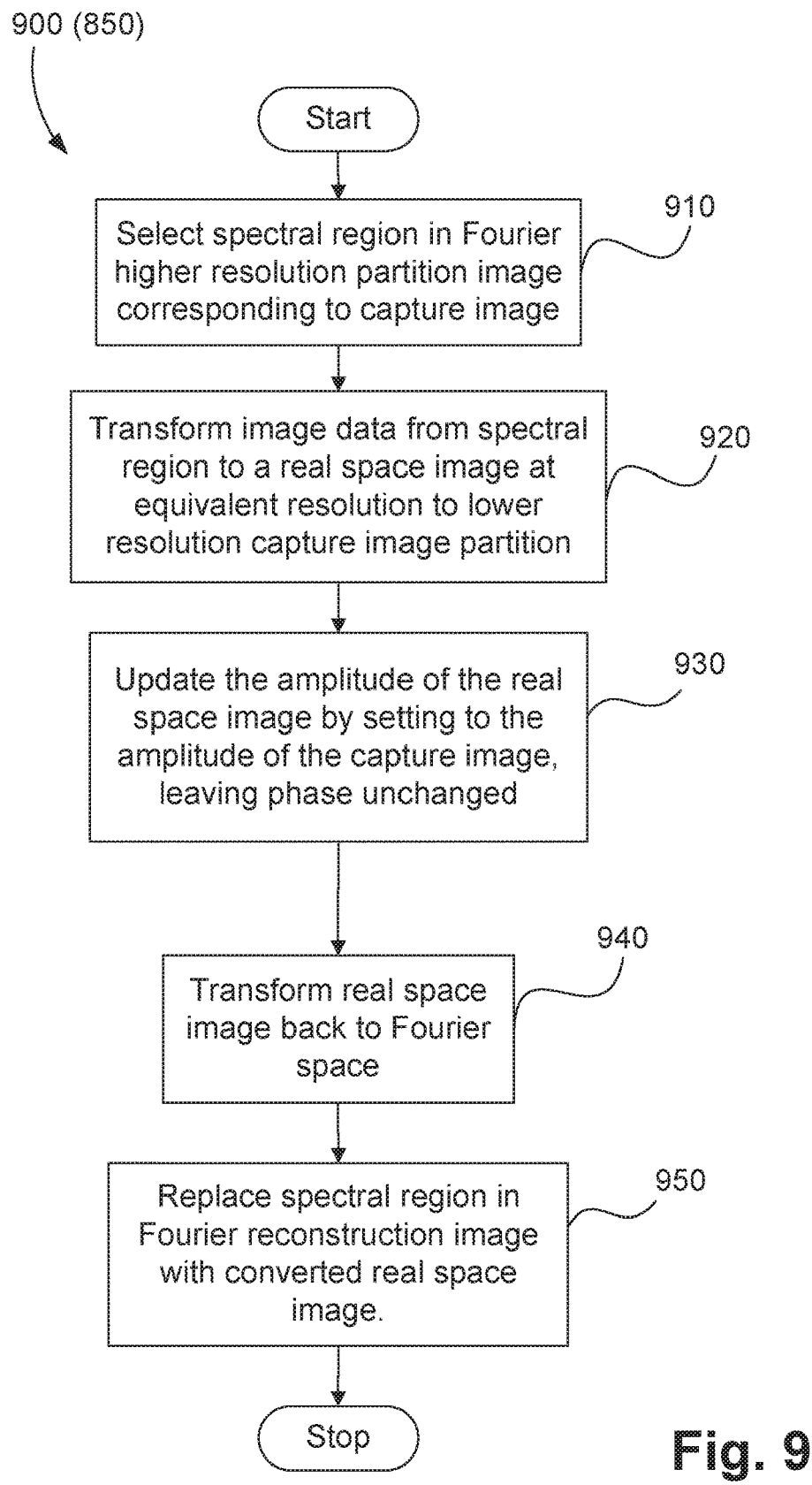
FIG. 9 is a schematic flow diagram of a method of updating a higher resolution partition image based on a single lower resolution partition image.

Method 900, used at step 850 to update the higher resolution partition image based on a single lower resolution partition image will now be described in further detail below with reference to FIG. 9.

In step 910, the processor 1805 selects a spectral region in the higher resolution partition image corresponding to the currently selected partition image from a lower resolution capture. This is achieved as illustrated in FIG. 10B which shows the Fourier space representations of a specimen, a dashed circle representing the spectral region 1005 associated with a single capture image, and a transverse wavevector shown by the solid arrow that corresponds to the configuration of the illumination. The spectral region 1005 may be selected by allocating each pixel in the higher resolution partition image as inside or outside the circular region, and multiplying all pixels outside the region by zero and those inside by 1. Alternatively, interpolation can be used for pixels near the boundary to avoid artefacts associated with approximating the spectral region geometry on the pixel geometry. In this case, pixels around the boundary may be multiplied by a value in the range 0 to 1.

It is noted that if the variable illuminator 108 does not illuminate with plane waves at the specimen 102, then the angle of incidence for a given illumination configuration may vary across the specimen, and therefore between different partitions. This means that the set of spectral regions corresponding to a single illumination configuration may be different for different partitions.

Optionally, the signal in the spectral region may be modified in order to handle aberrations in the optics. For example, the spectral signal may be multiplied by a phase function to handle certain pupil aberrations. The phase function may be determined through a calibration method, for example by optimising a convergence metric (formed when performing the generation of a higher resolution image for a test specimen) with respect to some parameters of the pupil aberration function. The pupil function may vary over different partitions as a result due to slight differences in the local angle of incident illumination over the field of view.

Next, at step 920, the image data from the spectral region is transformed by the processor 1805 to a real space image at equivalent resolution to the lower resolution capture image partition. The spectral region may be zero-padded prior to transforming with the inverse 2D Fourier transform. The amplitude of the real space image is then set to match the amplitude of the equivalent (current) lower resolution partition image at step 930. The complex phase of the real space image is not altered at this step. The real space image is then Fourier transformed at step 940 to give a spectral image. Finally, at step 950, the signal in the spectral region of the higher resolution partition image selected at step 910 is replaced with the corresponding signal from the spectral region in the spectral image formed at step 940. It is noted that in order to handle boundary related artefacts, it may be preferable to replace a subset of the spectral region that does not include any boundary pixels. If the signal in the spectral region was modified to handle aberrations at step 910, then a reverse modification should be performed as part of step 950 prior to replacing the region of the higher resolution partition image at this stage.

First Exemplary Implementation

Figure 11A:
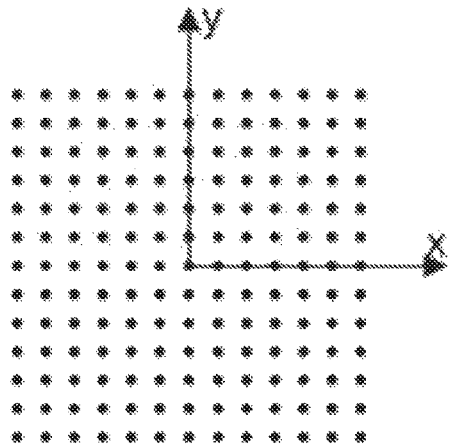
FIGS. 11A to 11F illustrate spatial arrangements of light sources as projected on a plane perpendicular to the optical axis and the corresponding transverse wavevectors.
Figure 11B:
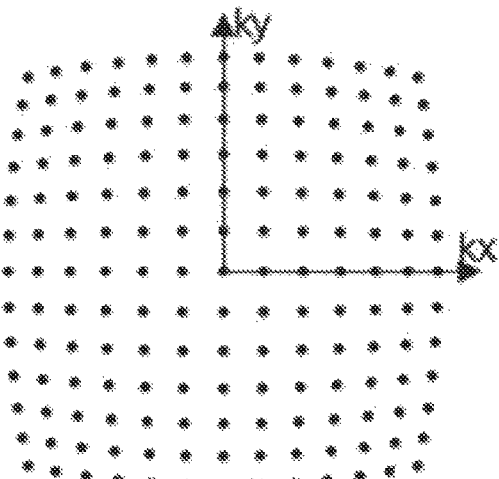
Figure 11C:
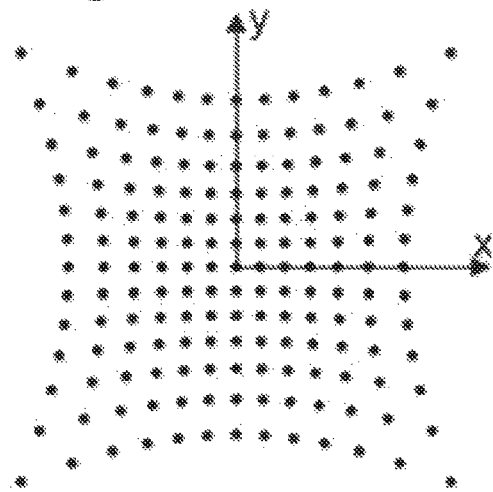
Figure 11D:
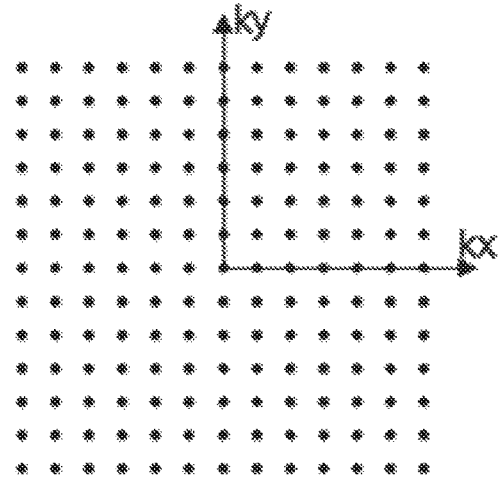
Figure 11E:
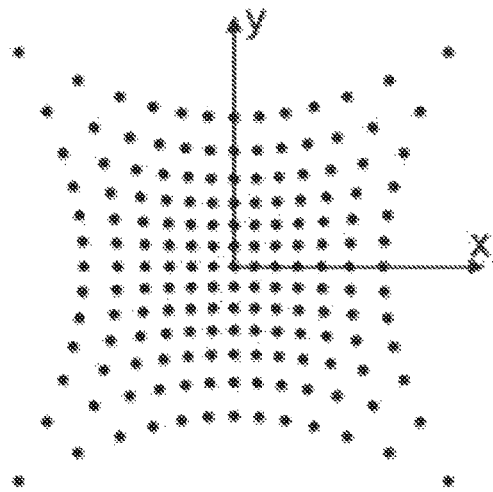
Figure 11F:
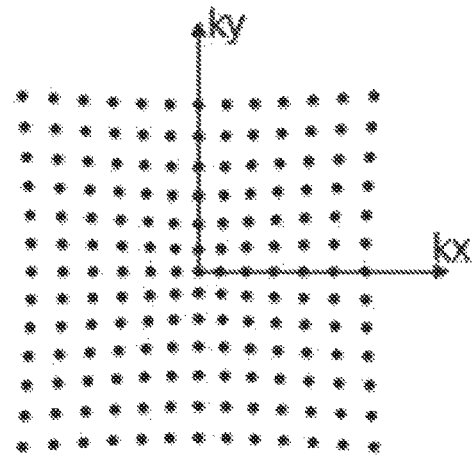

FIGS. 11A, 11C and 11E illustrate spatial arrangements of light sources as projected on a plane perpendicular to the optical axis. The corresponding transverse wavevectors are shown in FIGS. 11B, 11D, and 11F respectively. FIG. 11A shows the prior art arrangement of light sources as a regular square lattice on an LED matrix, with a LED spacing corresponding to a fraction of 0.40 of the acceptance angle $\theta_F$ at the centre of the arrangement. The corresponding set of transverse wavevectors shown in FIG. 11B are not evenly spaced, having an increased spacing in the centre compared to the outside of the arrangement.

FIG. 11D shows an alternative set of transverse wavevectors which are regularly or evenly spaced with a light source spacing corresponding to a fraction of 0.5 of the acceptance angle $\theta_F$. In order to achieve this arrangement, the light sources are positioned so that they form the arrangement shown in FIG. 11C on a projected plane perpendicular to the optical axis. The density of light sources is larger in the centre compared to the outside of the arrangement. By corollary, the density of positions of illumination drops substantially to zero outside the circular region established by illumination afforded within the optical system.

A further modification may be made by applying a transform to the desired set of transverse wavevectors. FIG. 11F shows a set of transverse wavevectors that have been modified in this way, and FIG. 11E shows the corresponding arrangement on a projected plane perpendicular to the optical axis.

A variety of suitable transforms exist, some examples being defined in terms of the radial coordinates, $(k_r, k_\theta)$, of the transverse wavevector which are defined such that $k_x+jk_y=k_r e^{jk_\theta}$ and may be calculated as follows:

$$k_r = \sqrt{(k_x)^2+(k_y)^2},$$

$$k_\theta = \arctan2(k_x, k_y), \quad (6)$$

A suitable transform is to scale the radial component of the transverse wavevector according to a power law, for example:

$$k_r \rightarrow \frac{k_0}{4}\left(\frac{4k_r}{k_0}\right)^\gamma, \quad (7)$$

where a suitable value for the parameter $\gamma$ is 1.15 if the spacing of the light sources corresponds to a fraction of 0.55 of the acceptance angle $\theta_F$. The Cartesian transverse wavevectors are then simply given by $k_x=k_r \cos\theta$ and $k_y=k_r \sin\theta$. Other suitable transforms may be defined in terms of simple nonlinear functional forms such as polynomial, rational, trigonometric, logarithmic or combinations of these. According to Equations (6) and (7), positions of illumination on the plane (e.g. 11E, 12E, 14E, 15E, 16E) map to 2D wavevectors in a Fourier reconstruction space such that the density is greater towards the wavevector corresponding to the DC term of the Fourier reconstruction (e.g. respectively 11F, 12F, 14F, 15F, 16F). The density of light sources increases in lower radial wavevectors in the central region of Fourier space. This is seen for example in FIGS. 11F, 12F, 14F, 15F, and 16F.

In general, a set of illumination configurations corresponding to FIGS. 11A and 11B will be referred to as (prior art) arrangement (P), however the number of light sources and parameters of the arrangement may differ from the illustrations. Similarly, an arrangement corresponding to FIGS. 11E and 11F will be referred to as (A1). The arrangements illustrated in FIGS. 11A to 11F may be used in an FPM system such as that illustrated in FIG. 1. The arrangements in FIGS. 11C to 11F can be advantageous for improved accuracy of reconstruction in terms of the performance over the arrangement in FIGS. 11A and 11B.

Second Exemplary Implementation

Figure 12A:
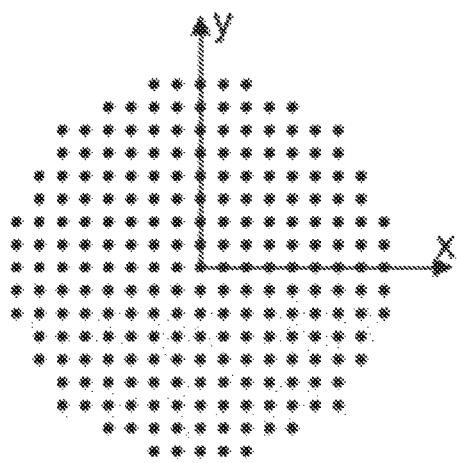
FIGS. 12A to 12F illustrate spatial arrangements of light sources as projected on a plane perpendicular to the optical axis and the corresponding transverse wavevectors.
Figure 12B:
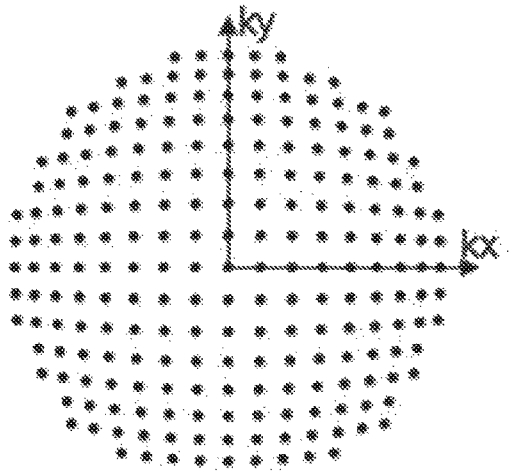
Figure 12C:
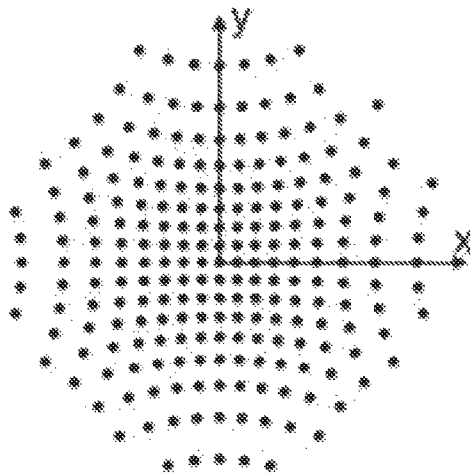
Figure 12D:
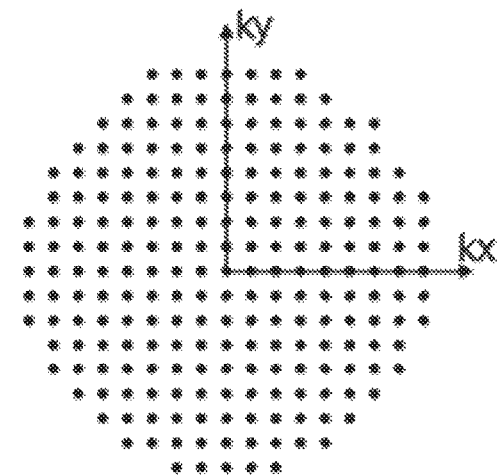
Figure 12E:
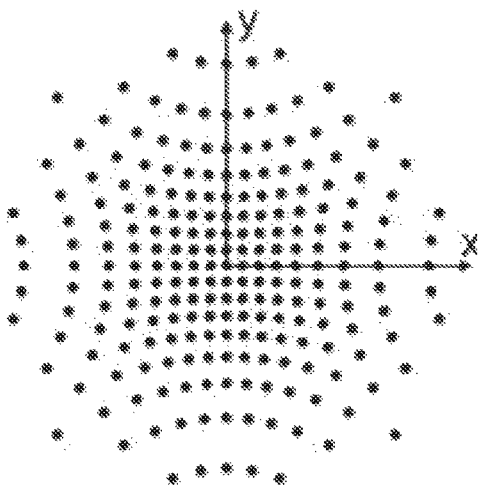
Figure 12F:
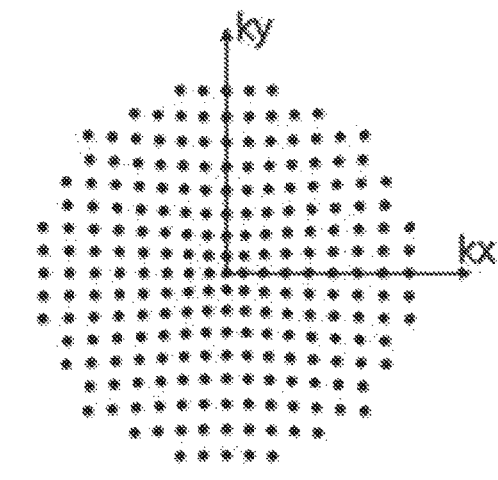

FIGS. 12A, 12C and 12E illustrate spatial arrangements of light sources as projected on a plane perpendicular to the optical axis. The corresponding transverse wavevectors are shown in FIGS. 12B, 12D, and 12F respectively. The positions corresponding to most of the light sources, and therefore also the transverse wavevectors, are the same as those in the corresponding images in FIG. 11A to 11F. Note with respect to FIG. 12D that the transverse wavevectors are substantially evenly-spaced. In the arrangements shown in FIGS. 12A to 12F, however, the set of light sources is selected based on a cutoff at a specific radial wavevector. This arrangement may be referred to as a circular support.

The configuration illustrated in FIGS. 12A and 12B will be referred to as (A2), however the number of light sources and parameters of the arrangement may differ from the illustrations. The arrangements illustrated in FIG. 12 may be used in an FPM system such as that illustrated in FIG. 1, and may be advantageous in terms of the system performance when compared with the equivalent arrangements in FIG. 11.

Third Exemplary Implementation

Figure 13A:
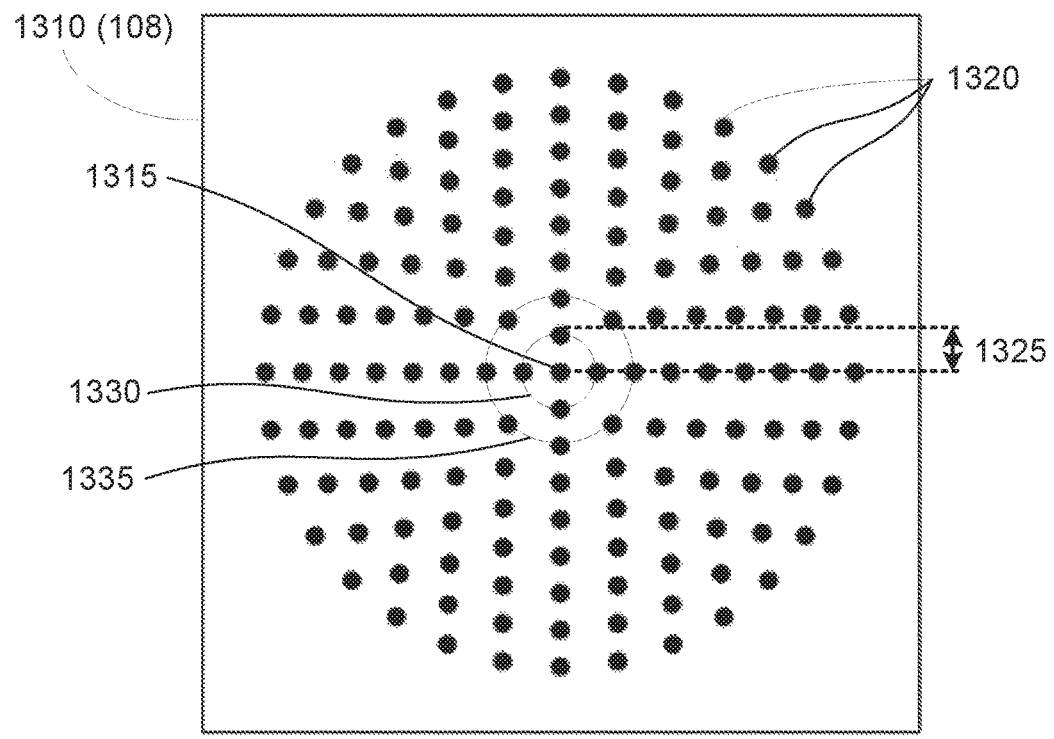
FIGS. 13A and 13B illustrate two alternative spatial arrangements of light sources for a variable illuminator 108.
Figure 13B:
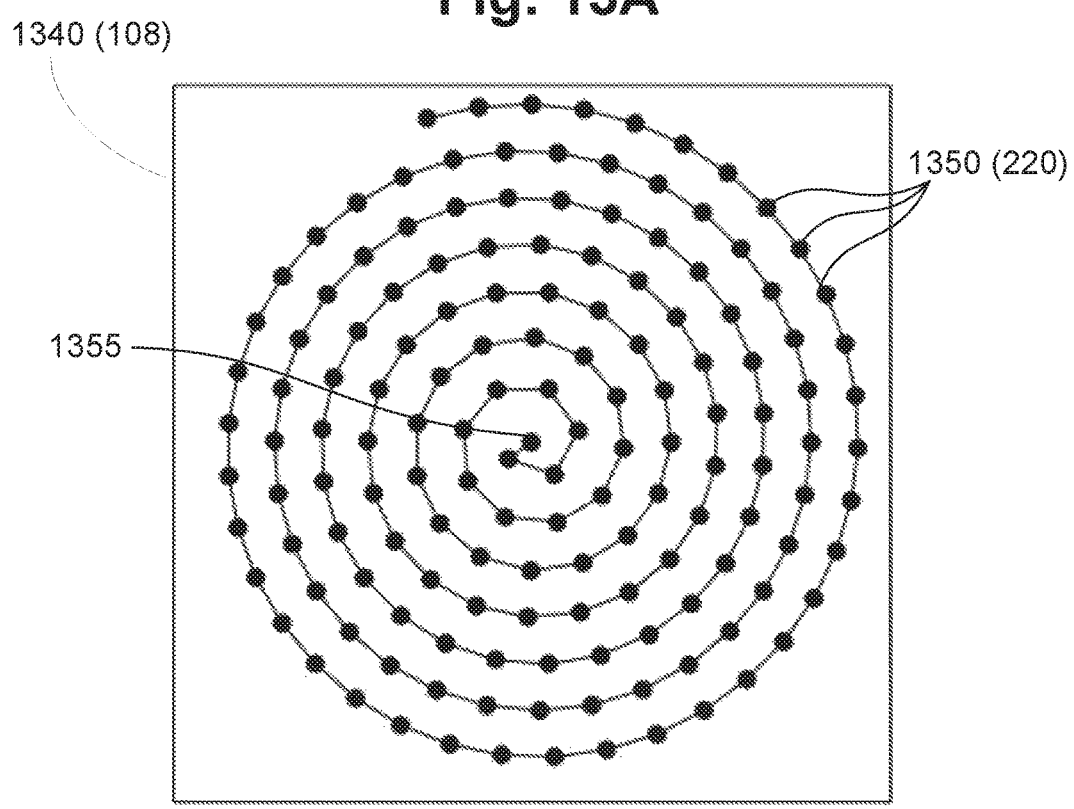

FIGS. 13A and 13B illustrate two alternative spatial arrangements of light sources for a variable illuminator 108 that can be advantageous in terms of the system performance compared to some of the arrangements shown in FIGS. 11 and 12. The illumination angles formed by the arrangements of FIGS. 13A and 13B form substantially regular patterns when defined in terms of polar coordinates, rather than the Cartesian coordinates that form the natural basis for defining the square lattice structure shown in FIG. 2A. The polar coordinate system is defined in the spatial domain by a radial coordinate that depends on the magnitude of the distance of the light source from the optical axis as projected on a plane perpendicular to the optical axis and an angular coordinate that corresponds to the angle of the light source around the optical axis in the projected plane. In the Fourier domain the polar coordinates are the radial coordinates of the transverse wavevector, $(k_r, k_\theta)$, defined in equation 6.

FIG. 13A shows a concentric arrangement 1310 for a variable illuminator 108 including light sources 1320 (220) positioned in a number of concentric rings or circles, where the rings are equally spaced in the radial coordinate. The number of light sources on each ring is proportional to the index of the concentric ring, with an additional light source at the centre 1315, being a position of illumination or circle with a radial distance of zero (0). In the example shown, the spacing of the concentric rings is marked 1325. The number of light sources in a first innermost ring 1330 is 4, then 8 in the second ring 1335, and 4i in the $i^{th}$ concentric ring. The light sources are equally spaced in angle on each ring. As such, the positions of illumination are spaced evenly on concentric circles such that the number of angular locations selected around each circle increases monotonically with its radius. This configuration can be expressed as the set of light source positions given by $x_{i,j}=r_i \cos \theta_{i,j}$ and $y_{i,j}=r_i \sin \theta_{i,j}$ with:

$$r_i = i\Delta r \qquad (8)$$

$$\theta_{i,j} = \frac{2\pi j}{iN_\theta},$$

where the indices take the ranges $i=0, \ldots, N_r$ and $j=0, \ldots, \max(0, iN_\theta-1)$, and $\theta_{0,0}$ takes the value zero. The number of rings is defined by $N_r$ and the number of additional light sources per concentric ring is given by $N_\theta$. For the example in FIG. 13A, the parameters are $N_r=8$ and $N_\theta=4$. A suitable spacing for the concentric rings 1325 corresponds to a fraction of between 0.3 and 0.45 of the acceptance angle $\theta_F$.

FIG. 13B shows a spiral arrangement 1340 for a variable illuminator 108 incorporating light sources 1350 (220). The positions are selected at a set of indices such that the radius and angle are proportional to the square root of the index. This configuration can be expressed as the set of light source positions given by $x_i = r_i \cos \theta_i$ and $y_i=r_i \sin \theta_i$ with:

$$r_i=S_r\sqrt{i},$$

$$\theta_i=S_\theta\sqrt{i}, \qquad (9)$$

for $i=0, \ldots, (N-1)$, where N is the total number of light sources. Suitable parameters for the design are given by $S_r$ corresponding to a fraction of 0.325 of the acceptance angle $\theta_F$ and $S_\theta=0.3$.

As mentioned above, the concentric and spiral arrangements form substantially regular patterns, when defined in polar coordinates. In the concentric arrangement, the light sources are equally spaced in angle on each concentric ring. In the spiral arrangement, the angle is proportional to square root of the index of the light source.

Other arrangements are possible based on these models. For example, the concentric arrangement may be modified such that the number of light sources on each concentric ring in the concentric arrangement varies in a nonlinear manner, or in irregular steps, while maintaining the equal angular spacing on each ring. Alternatively, a pattern may be formed by combining a number of discrete polar arrangements together with different parameter values (preferably without including multiple light sources at the centre). Interesting arrangements useful for Fourier ptychography may be formed from a set of spirals placed at different angles to each other to achieve improved accuracy or efficiency.

Figure 14C:
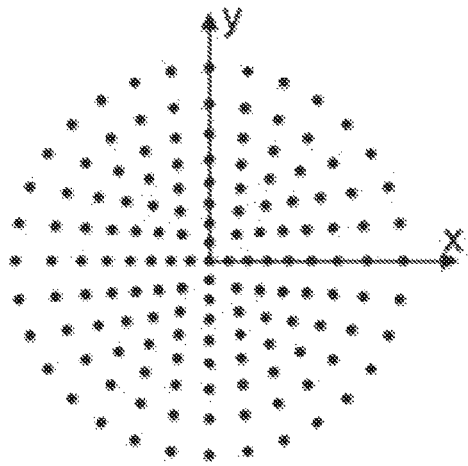
Figure 14D:
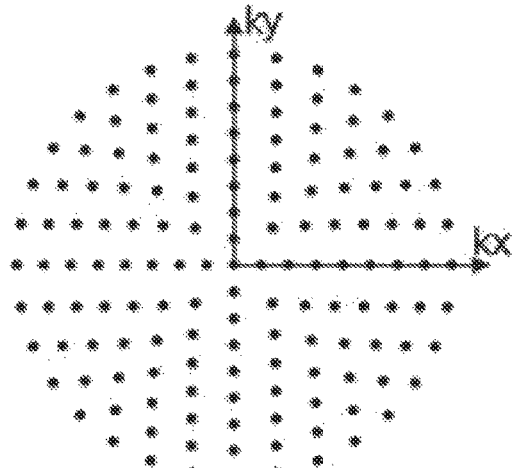
Figure 14E:
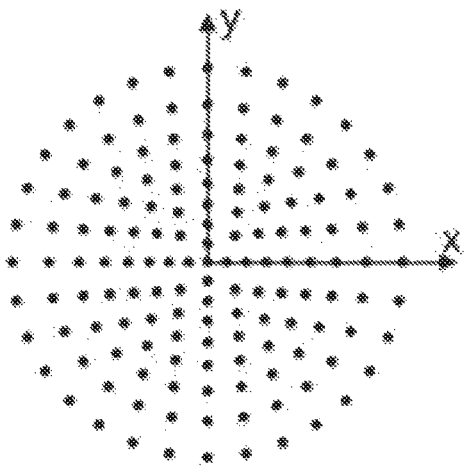
Figure 14F:
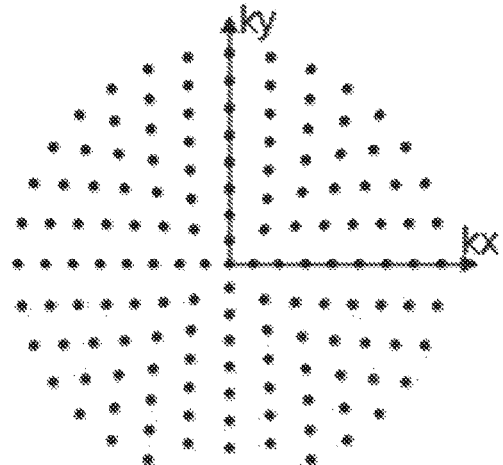
Figure 15A:
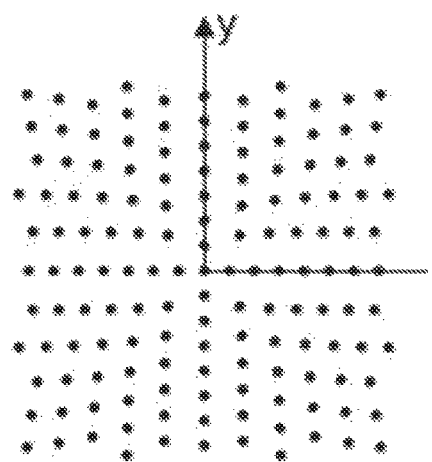
FIGS. 15A to 15F illustrate spatial arrangements of light sources as projected on a plane perpendicular to the optical axis and the corresponding transverse wavevectors.
Figure 15B:
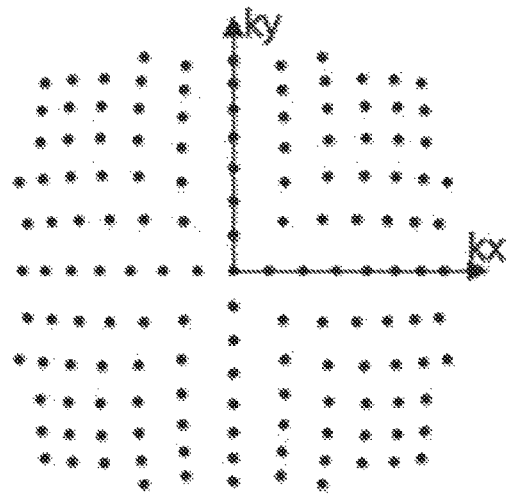
Figure 15C:
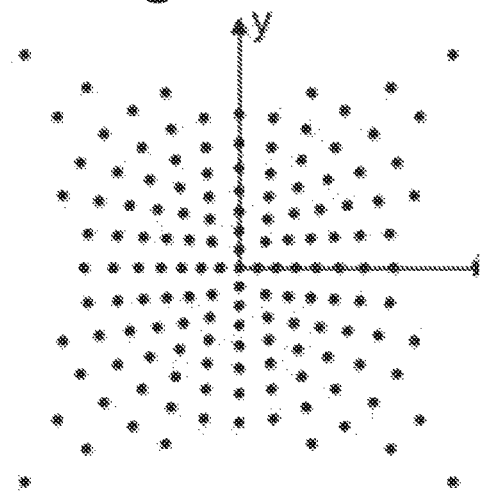
Figure 15D:
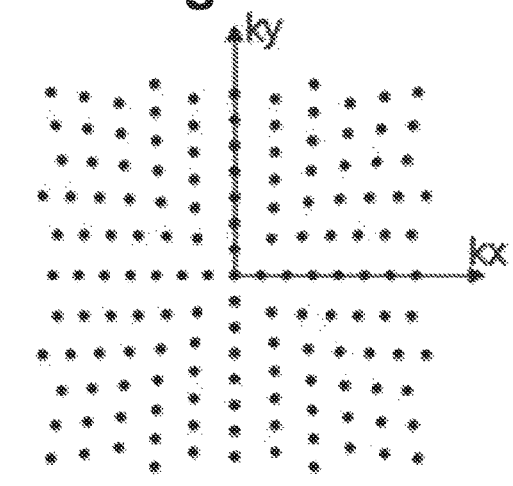
Figure 15E:
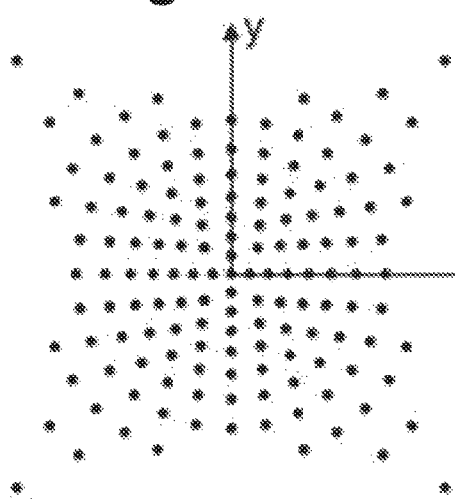
Figure 15F:
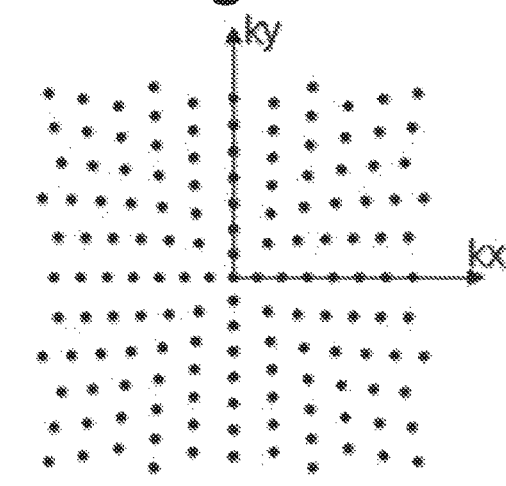

FIGS. 14A, 14C and 14E illustrate spatial arrangements of light sources as projected on a plane perpendicular to the optical axis based on a concentric arrangement (e.g. FIG. 13A). The corresponding transverse wavevectors are shown in FIGS. 14B, 14D, and 14F respectively. These arrangements may be used in an FPM system such as that illustrated in FIG. 1 and offer improvements in performance over the arrangement in FIGS. 11A and 11B with respect to accuracy and/or efficiency.

FIG. 14A shows a concentric arrangement of light sources projected on a plane perpendicular to the optical axis based on a concentric arrangement. The corresponding set of transverse wavevectors shown in FIG. 14B are not evenly spaced, having an increased spacing in the centre compared to the outside of the arrangement. The spacing 1325 of concentric rings corresponds to a fraction of 0.35 of the acceptance angle $\theta_F$ at the centre of the arrangement.

FIG. 14D shows an alternative set of transverse wavevectors which form a regular concentric arrangement defined in the transverse wavevector space. In order to achieve this arrangement, the light sources are positioned so that they form the arrangement shown in FIG. 14C on a projected plane perpendicular to the optical axis. The density of light sources is larger in the centre compared to the outside of the arrangement. The spacing 1325 of concentric rings corresponds to a fraction of 0.45 of the acceptance angle $\theta_F$.

A further modification may be made by applying a transform to the desired set of transverse wavevectors. FIG. 14F shows a set of transverse wavevectors that have been modified in this way, and FIG. 14E shows the corresponding arrangement on a projected plane perpendicular to the optical axis. A variety of suitable transforms exist, as discussed above with reference to FIG. 11F. The spacing 1325 of concentric rings corresponds to a fraction of 0.45 of the acceptance angle $\theta_F$ and the parameter $\gamma$ is 1.05 for a nonlinear (power law) transform defined by equation (7). The arrangements illustrated in FIGS. 14E and 14F will be referred to as (A123), however the number of light sources and the precise parameterisation of the arrangement may differ from the illustrations. Use of the power law provides for positions of illumination on the plane map to 2D wavevectors in a Fourier reconstruction space such that the density is greater towards the wavevector corresponding to the DC term of the Fourier reconstruction.

It is noted that a subset of the concentric or spiral arrangements may be selected that are non-circular in its extent. For example, the set of light sources falling within a square geometry may be selected. FIGS. 15A to 15F illustrate three such arrangements that are based on the arrangements in FIGS. 14A to 14F but with selection based on a square geometry. The arrangements illustrated in FIGS. 15A and 15B will be referred to as (A3), however the number of light sources and the precise parameterisation of the arrangement may differ from the illustrations.

Figure 16A:
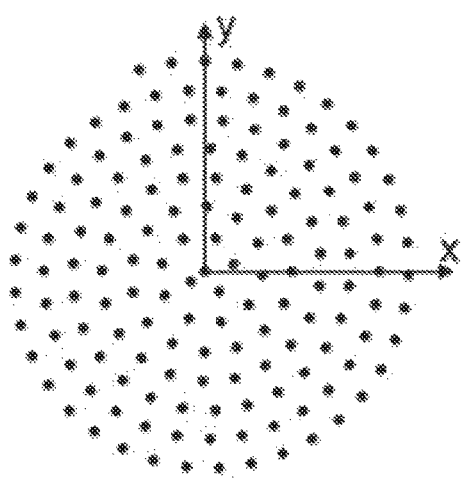
FIGS. 16A to 16F illustrate spatial arrangements of light sources as projected on a plane perpendicular to the optical axis and the corresponding transverse wavevectors.
Figure 16B:
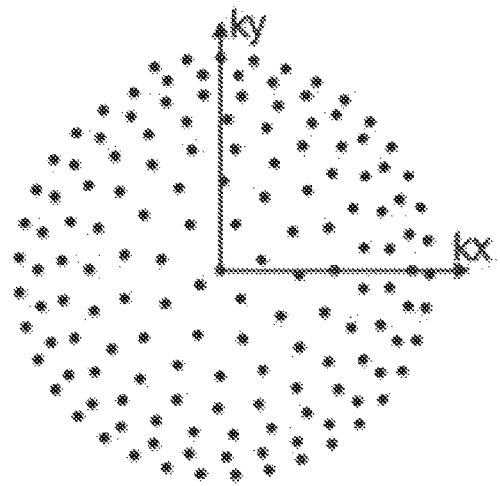
Figure 16C:
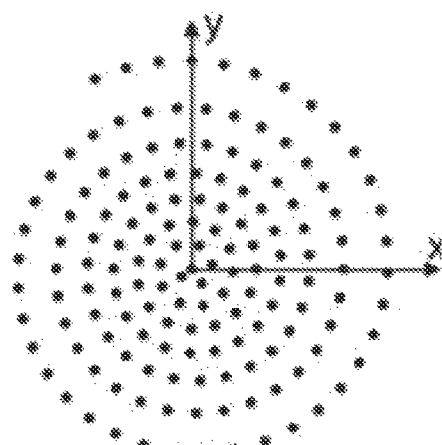
Figure 16D:
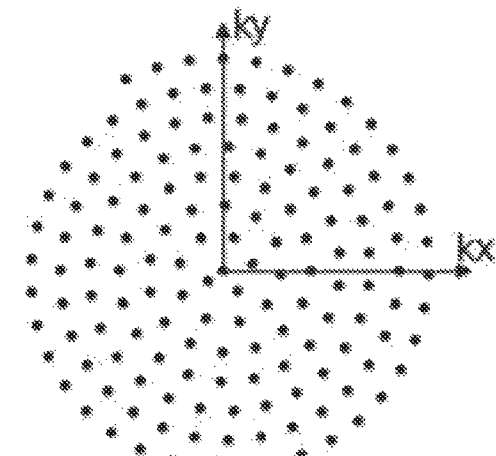
Figure 16E:
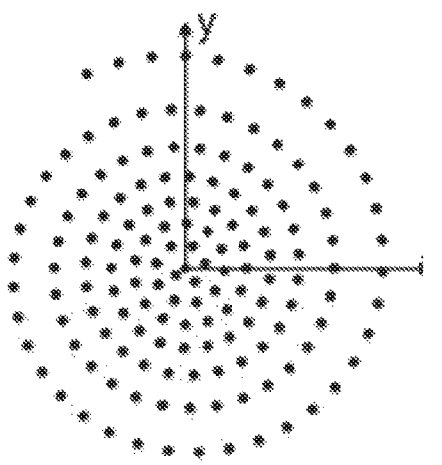
Figure 16F:
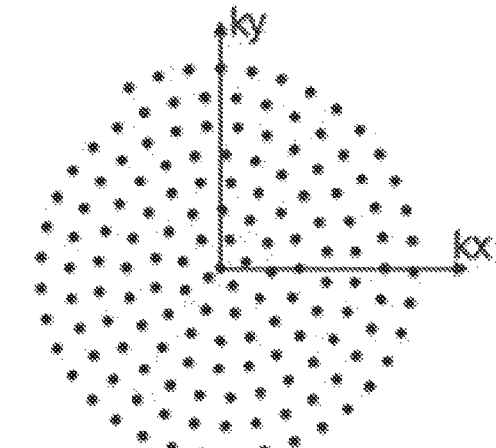

FIGS. 16A, 16C and 16E illustrate spatial arrangements of light sources as projected on a plane perpendicular to the optical axis based on a spiral arrangement (FIG. 13B). The corresponding transverse wavevectors are shown in FIGS. 16B, 16D, and 16F respectively. These arrangements may be used in an FPM system such as that illustrated in FIG. 1 and offer improvements in performance over the arrangement in FIGS. 11A and 11B with respect to accuracy and/or efficiency.

FIG. 16A shows a spiral arrangement of light sources projected on a plane perpendicular to the optical axis based on a spiral arrangement. The corresponding set of transverse wavevectors shown in FIG. 16B are not evenly spaced, having an increased spacing in the centre compared to the outside of the arrangement. Suitable parameters for the design are given by $S_r$ corresponding to a fraction of 0.325 of the acceptance angle $\theta_F$ and $S_\theta=0.3$ at the centre of the arrangement.

FIG. 16D shows an alternative set of transverse wavevectors which form a regular spiral arrangement defined in the transverse wavevector space. In order to achieve this arrangement, the light sources should be positioned so that they form the arrangement shown in FIG. 16C on a projected plane perpendicular to the optical axis. The density of light sources becomes larger toward the centre compared to the outside of the arrangement. Suitable parameters for the configuration are given by $S_r$ corresponding to a fraction of 0.325 of the acceptance angle $\theta_F$ and $S_\theta=0.3$.

A further modification may be made by applying a transform to the desired set of transverse wavevectors. FIG. 16F shows a set of substantially regularly-spaced transverse wavevectors that have been modified in this way, and FIG. 16E shows the corresponding arrangement on a projected plane perpendicular to the optical axis. A variety of suitable transforms exist, as discussed above with reference to FIG. 11F. Suitable parameters for this configuration are given by $k_r$ corresponding to a fraction of 0.35 of the acceptance angle $\theta_F$, $k_\theta=0.3$ and the parameter $\gamma$ is 1.05 for a nonlinear transform defined by equation (7).

Fourth Exemplary Implementation

In some applications, it may be advantageous to switch on multiple light sources at one time and capture lower resolution images on the camera 103. The computer processing required to generate the higher resolution image would be different in this case, owing to a need for additional processing from a non-adjacent sources and hence angles, however similar advantages over prior art variable illumination arrangements may be obtained.

Advantage

Estimates of the comparative performance of the above arrangements may be quantified using simulations of an FPM system with different variable illumination arrangements corresponding to different sets of illumination configurations. A large image of a histopathology slide may be used to simulate an infinitesimally thin specimen, and it is assumed that the specimen is in focus so that the effects of depth are small and may be ignored. Each low resolution capture image may be synthesised by selecting a small aperture in Fourier space corresponding to a low NA lens at a wavevector offset position corresponding to the angle of illumination. The low NA lens acts as a low resolution optical element to filter light in the imaging system. Spatial padding and a suitable windowing function may be used in the synthesis of these images to avoid artefacts at the image boundaries. The Tukey and Planck-taper window functions are suitable window functions for this purpose. The synthesised capture image is selected from the region at the centre of the synthesised image for which the window function is flat and takes the value 1.

The capture images are processed according to method 600 (580) for a fixed number of iterations and the reconstructed image may be compared to the true image. Metrics such as mean square error and structural similarity (SSIM) are suitable for the comparison.

Figure 17:
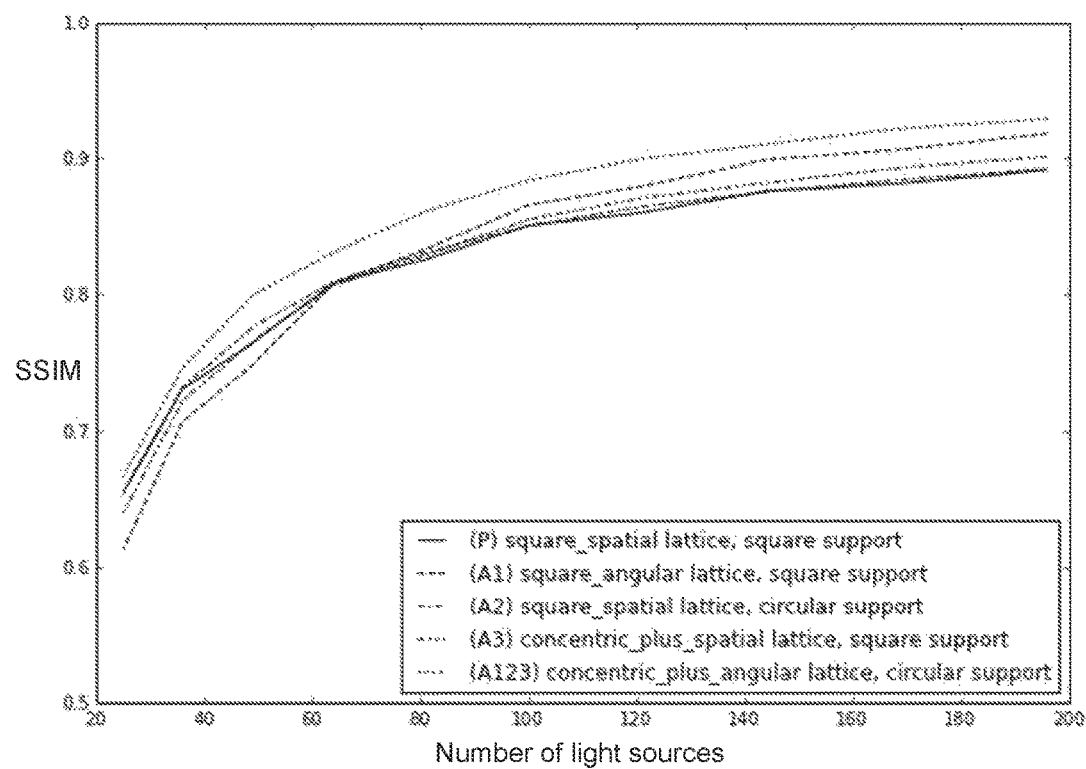
FIG. 17 shows plots of the SSIM index against the simulated number of light sources for a number of variable illuminator configurations described herein.

FIG. 17 shows plots of the SSIM index against the simulated number of light sources for a number of light source arrangements described herein. Although each plot consists of a number of discrete points, a straight line interpolation is included between the points. The light source arrangements plotted are referred to as P (FIGS. 11A and 11B), A1 (FIGS. 11E and 11F), A2 (FIGS. 12A and 12B), A3 (FIGS. 15A and 15B), and A123 (FIGS. 14E and 14F). For the same number of light sources, the arrangements A1, A3, and A123 show an improved SSIM compared to the prior art arrangement P over a substantial part of the plot range. This means that for a given target reconstruction accuracy (SSIM score), the number of light sources required would be less for arrangements A1, A3 and A123 relative to the prior art P.

It is possible to estimate the reduction in the number of light sources required to achieve a given score using the interpolation data shown in FIG. 17. For example, for 196 light sources the arrangement P has an SSIM of 0.892. The estimated numbers of light sources to achieve the same SSIM for the other arrangements are given in Table 1 below. For arrangement A1 the number of light sources reduces to 134, for A2 the number reduces to 194, for A3 the number reduces to 164, and for arrangement A123 it reduces to 108. In this simulation the number of required light sources can be nearly halved by using the combination of design improvements of configuration A123. Based on the shape of the curves in FIG. 17, the advantage will increase further as the required SSIM increases.

TABLE 1

Estimated required number of light sources and % reduction to achieve given SSIM for FPM simulation.

| Configuration | P | A1 | A2 | A3 | A123 |
|---|---|---|---|---|---|
| Number of light sources to achieve SSIM = 0.892 | 196 | 134 | 194 | 164 | 108 |
| % Change relative to arrangement P | — | −32% | −1% | −16% | −45% |

It is noted that the advantage estimates described above with reference to FIG. 17 correspond to the case of plane wave illumination. If the variable illuminator is an LED matrix positioned relatively close to the specimen then the incident illumination cannot be considered to form a plane wave at the specimen and the mapping from position to wavevector would vary across the transverse dimensions of the specimen. This would alter the arrangement in wavevector space, which would in turn change the performance of the FPM system. In general this would reduce the advantage of the FPM arrangement relative to the prior art arrangement P.

Furthermore, it is noted that it the above variable illuminator arrangements may be substantially achieved using an LED matrix with a very dense arrangement of LEDs on a regular grid. For each LED position in the design, an LED from the LED matrix may be selected that is close to the position of the corresponding light source in the variable illuminator arrangement. This essentially uses a subsampling of the LED matrix light sources to illuminate the specimen to thereby use that subset of sources that are close to the desired position in the illuminator arrangement.

INDUSTRIAL APPLICABILITY

The arrangements described are examples of apparatus for Fourier ptychographic imaging and are applicable to the computer and data processing industries, and particularly for the microscopic inspection of matter, including biological matter. For example, specific arrangements according to the present disclosure provide for reducing the number of light sources to achieve a similar imaging effect as prior arrangements, or to provide improved performance using comparable numbers of light sources.

The arrangements disclosed, particularly through the control of the illuminator 108 (via 118) and the camera 103 (via 120) provide for the computer 105, when appropriately programmed, to implement the Fourier ptychographic imaging system. More specifically, the application program 1833 can be configured to control the illuminator and camera to cause the capture of the images 104 and then to process the images 104 as described to form a desired (higher resolution) image of the specimen.

The foregoing describes only some embodiments of the present invention, and modifications and/or changes can be made thereto without departing from the scope and spirit of the invention, the embodiments being illustrative and not restrictive.

The invention claimed is:

1. Apparatus for forming an image of a substantially translucent specimen, the apparatus comprising:
    a variable illuminator configured to illuminate the specimen from a plurality of angles of illumination such that when each angle at a given point on the specimen is mapped to a point on a plane perpendicular to an optical axis, the points on the plane have an increasing density towards an axial position on the plane, and also such that one of the points on the plane is substantially coincident with the axial position on the plane;
    a detector configured to acquire a plurality of variably-illuminated, relatively lower-resolution intensity images of the specimen based on light filtered by an optical element; and
    a processor for computationally reconstructing a relatively higher-resolution image of the specimen by iteratively updating overlapping regions of the relatively higher-resolution image in a Fourier reconstruction space with the variably-illuminated, lower-resolution intensity images,
    wherein the variable illuminator is configured such that the points on the plane are spaced evenly on concentric circles and such that a number of angular locations selected around each circle increases monotonically with the radius of the circle.

2. Apparatus according to claim 1, wherein the points on the plane map to two-dimensional (2D) spatial frequencies in the Fourier reconstruction space that are approximately evenly spaced.

3. Apparatus according to claim 1, wherein the points on the plane map to 2D spatial frequencies in the Fourier reconstruction space such that a density of the spatial frequencies is greater towards a spatial frequency corresponding to a DC term of the Fourier reconstruction.

4. Apparatus according to claim 3, wherein the density of the spatial frequencies is greater towards the spatial frequency corresponding to the DC term of the Fourier reconstruction according to a power law.

5. Apparatus according to claim 1, wherein the points on the plane map to 2D spatial frequencies in the Fourier reconstruction space such that the spatial frequencies form a substantially regular pattern in a polar coordinate system in which the location of each spatial frequency in the pattern is defined by a radial coordinate that depends on a modulus of the spatial frequency, and an angular coordinate that depends on an angle of the spatial frequency.

6. Apparatus according to claim 1, wherein a density of the points on the plane drops substantially to zero outside a circular region that includes the axial position.

7. Apparatus according to claim 1, wherein the points on the plane form one or more spiral arrangements.

8. Apparatus according to claim 1, wherein the iterative updating of the overlapping regions is formed using corresponding regions in Fourier space of the variably-illuminated, relatively low-resolution images.

9. Apparatus for forming an image of a substantially translucent specimen, the apparatus comprising:
    an imaging system for illuminating and imaging the specimen based on light filtered by an optical element, the imaging system including:
    a detector configured to acquire a plurality of relatively lower resolution intensity images of the specimen based on light filtered by the optical element, wherein the content of the of the relatively lower-resolution intensity images of the specimen corresponds to partially overlapping regions in a two-dimensional (2D) spatial frequency Fourier reconstruction space that are arranged with a substantially regular pattern in a polar coordinate system in which the location of each spatial frequency in the pattern is defined by a radial coordinate that depends on a modulus of the spatial frequency, and an angular coordinate that depends on an angle of the spatial frequency;
    a variable illuminator operable to control the spatial frequency associated with the relatively lower-resolution intensity images according to angles of illumination between individual light sources of the variable illuminator and the specimen such that the modulus of a spatial frequency associated with one of the partially overlapping regions is substantially zero; and
    a processor for computationally reconstructing a relatively higher-resolution image of the specimen by iteratively updating overlapping regions of the relatively high-resolution image in a Fourier reconstruction space with the lower-resolution intensity images,
    wherein positions of illumination that correspond to the light sources are arranged in a plane perpendicular to the optical axis and are spaced evenly on concentric circles such that the number of angular locations selected around each circle increases monotonically with the radius of the circle.

10. Apparatus according to claim 9, further comprising a scanning aperture.

11. Apparatus according to claim 9, further comprising a spatial light modulator.

12. Apparatus according to claim 9, further comprising a position of illumination at the centre of the circles.

13. Apparatus according to claim 9, wherein positions of illumination that correspond to the light sources form one or more spiral arrangements.

14. Apparatus according to claim 9, wherein a density of positions of illumination that correspond to the light sources drops substantially to zero outside a circular region.

15. Apparatus according to claim 9, wherein positions of illumination that correspond to the light sources and that are on a plane map to two-dimensional (2D) spatial frequencies in the Fourier reconstruction space that are approximately evenly spaced.

16. Apparatus according to claim 9, wherein positions of illumination that correspond to the light sources and that are on a plane map to 2D spatial frequencies in the Fourier reconstruction space such that the density of the spatial frequencies is greater towards a spatial frequency corresponding to a DC term of the Fourier reconstruction space.

17. Apparatus according to claim 16, wherein the density of the spatial frequencies is greater towards the spatial frequency corresponding to the DC term of the Fourier reconstruction space according to a power law.

18. Apparatus according to claim 9, wherein the iterative updating of the overlapping regions is formed using corresponding regions in the Fourier reconstruction space of the relatively low-resolution images.

19. A non-transitory tangible computer readable storage medium having a program recorded thereon, the program being executable by a computer apparatus to form an image of a substantially translucent specimen, the program comprising:

code for controlling an illuminator to variably illuminate the specimen from a plurality of angles of illumination such that:
(a) when each angle at a given point on the specimen is mapped to a point on a plane perpendicular to an optical axis, the points on the plane have an increasing density towards an axial position on the plane, and one of the points on the plane is substantially coincident with the axial position on the plane; or
(b) the illumination angles are arranged with a substantially regular pattern in a polar coordinate system defined by a radial coordinate that depends on the magnitude of the distance from an optical axis and an angular coordinate corresponding to the orientation of the angle relative to the optical axis, wherein one of the illumination angles is at or near zero;

code for controlling a detector to acquire a plurality of variably illuminated, relatively lower-resolution intensity images of the specimen based on light emitted from the illuminator according to variable illumination and filtered by an optical element; and code for computationally reconstructing a relatively higher-resolution image of the specimen by iteratively updating overlapping regions of the relatively higher-resolution image in Fourier space with the variably-illuminated, lower-resolution intensity images, wherein the illuminator is controlled such that the points on the plane are spaced evenly on concentric circles and such that a number of angular locations selected around each circle increases monotonically with the radius of the circle.

* * * * *